(12) United States Patent
Yagi et al.

(10) Patent No.: US 7,670,515 B2
(45) Date of Patent: Mar. 2, 2010

(54) METHOD FOR FABRICATING A MOLD FOR A MICROLENS

(75) Inventors: Takayuki Yagi, Kanagawa (JP);
Yasuhiro Shimada, Kanagawa (JP);
Takayuki Teshima, Kanagawa (JP);
Takashi Ushijima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1054 days.

(21) Appl. No.: 10/634,870

(22) Filed: Aug. 6, 2003

(65) Prior Publication Data
US 2004/0108210 A1    Jun. 10, 2004

Related U.S. Application Data

(62) Division of application No. 09/360,455, filed on Jul. 26, 1999, now Pat. No. 6,656,393.

(30) Foreign Application Priority Data

| Jul. 29, 1998 | (JP) | ................................ 1998/228666 |
| Apr. 19, 1999 | (JP) | ................................ 1999/110227 |
| Jul. 16, 1999 | (JP) | ................................ 1999/202396 |

(51) Int. Cl.
*B29D 11/00*    (2006.01)

(52) U.S. Cl. ........................... 264/2.5; 205/70; 425/808

(58) Field of Classification Search ................. 264/1.1, 264/2.5, 219; 205/70; 425/808
See application file for complete search history.

(56) References Cited

U.S. PATENT DOCUMENTS 3,565,718 A    2/1971   Steding  ..................... 156/150

FOREIGN PATENT DOCUMENTS

| GB | 1144867 | 3/1969 |
| JP | 6-27302 | 2/1994 |
| JP | 8-258051 | 10/1996 |

*Primary Examiner*—Mathieu D. Vargot
(74) *Attorney, Agent, or Firm*—Fitzpatrick, Cella, Harper & Scinto

(57) ABSTRACT

A method for fabricating a mold for a microlens having a desired radius (R) of curvature by electroplating. In this method, a minimum radius ($R_{min}$) of curvature is utilized to achieve the desired curvature radius.

3 Claims, 14 Drawing Sheets

METHOD FOR FABRICATING A MOLD FOR A MICROLENS

This application is a division of application Ser. No. 09/360,455, filed on Jul. 26, 1999 now U.S. Pat. No. 6,656,393, which is incorporated herein by reference.

BACKGROUND OF THE INVENTION

1. Field of the Invention

The present invention relates to a fabrication method of a microstructure, a fabrication method of a mold or a master of a mold (in the specification the term "mold" is chiefly used in a broad sense including both a mold and a master of a mold) for forming a microstructure, a fabrication method of a microstructure using the mold, and so forth. This invention particularly relates to a mold for a microlens or a microlens array, a fabrication method of the mold, and a fabrication method of the microlens or the microlens array using the mold.

2. Description of the Related Background Art

A microlens away typically has a structure of arrayed minute lenses each having a diameter from about 2 to 3 microns to about 200 or 300 microns and an approximately semispherical profile. The microlens away is usable in a variety of applications, such as liquid-crystal display devices, light receivers and inter-fiber connections in optical communication systems.

Meanwhile, earnest developments have been made with respect to a surface emitting laser and the like which can be readily arranged in an array form at narrow pitches between the devices. Accordingly, there exists a significant need for a microlens array with narrow lens intervals and a large numerical aperture (NA).

Likewise, a light receiving device, such as a charge coupled device (CCD), has been more and more downsized as semiconductor processing techniques develop and advance. Therefore, also in this field, the need for a microlens array with narrow lens intervals and a large NA is increasing.

In the field of such a microlens, a desirable structure is a microlens with a large light-condensing efficiency which can highly efficiently utilize light incident on its lens surface.

Further, similar desires exist in prospective fields of optical information processing, such as optical parallel processing-operations and optical interconnections. Furthermore, display devices of active or self-radiating types, such as electroluminescent (EL) panels, have been enthusiastically studied and developed, and a highly-defined and highly-luminous display has been thus proposed. In such a display, there is a heightened desire for a microlens array which can be produced at a relatively low cost and with a large area as well as with a small lens size and a large NA.

There are presently a number of prior art methods for fabricating microlenses.

In a prior art microlens-array fabrication method using an ion exchange method (see M. Oikawa, et al., Jpn. J. Appl. Phys. 20(1) L51-54, 1981), a refractive index is raised at plural places in a substrate of multi-component glass by using an ion exchange method. A plurality of lenses are thus formed at high-refractive index places. In this method, however, the lens diameter cannot be large, compared with intervals between lenses. Hence, it is difficult to design a lens with a large NA. Further, the fabrication of a large-area microlens array is not easy since a large scale manufacturing apparatus, such as an ion diffusion apparatus, is required to produce such a microlens array. Moreover, an ion exchange process is needed for each glass, in contrast with a molding method using a mold. Therefore, variations of lens quality, such as a focal length, are likely to increase between lots unless the management of fabrication conditions in the manufacturing apparatus is carefully conducted. In addition to the above, the cost of this method is relatively high, as compared with the method using a mold.

Further, in the ion exchange method, alkaline ions for ion-exchange are indispensable in a glass substrate, and therefore, the material of the substrate is limited to alkaline glass. The alkaline glass is, however, unfit for a semiconductor-based device which needs to be free of alkaline ions. Furthermore, since a thermal expansion coefficient of the glass substrate greatly differs from that of a substrate of a light radiating or receiving device, misalignment between the microlens array and the devices is likely to occur due to a misfit between their thermal expansion coefficients as an integration density of the devices increases.

Moreover, a compressive strain inherently remains on the glass surface which is processed by the ion exchange method. Accordingly, the glass tends to warp, and hence, a difficulty in joining or bonding between the glass and the light radiating or receiving device increases as the size of the microlens array increases.

In another prior art microlens-array fabrication method using a resist reflow (or melting) method (see D. Daly, et al., Proc. Microlens Arrays Teddington., p 23-34, 1991), resin formed on a substrate is cylindrically patterned using a photolithography process and a microlens array is fabricated by heating and reflowing the resin. Lenses having various shapes can be fabricated at a low cost by this resist reflow method. Further, this method has no problems of thermal expansion coefficient, warp and so forth, in contrast with the ion exchange method.

In the resist reflow method, however, the profile of the microlens is strongly dependent on the thickness of resin, wetting condition between the substrate and resin, and heating temperature. Therefore, variations between lots are likely to occur while a fabrication reproducibility per a single substrate surface is high.

Further, when adjacent lenses are brought into contact with each other due to the reflow, a desired lens profile cannot be secured due to the surface tension. Accordingly, it is difficult to achieve a high light-condensing efficiency by bringing the adjacent lenses into contact and decreasing an unused area between the lenses. Furthermore, when a lens diameter from about 20 or 30 microns to about 200 or 300 microns is desired, the thickness of deposited resin must be large enough to obtain a spherical surface by the reflow. It is, however, difficult to uniformly and thickly deposit the resin material having desired optical characteristics (such as refractive index and optical transmissivity). Thus, it is difficult to produce a microlens with a large curvature and a relatively large diameter.

In another prior art method, an original plate of a microlens is fabricated, lens material is deposited on the original plate and the deposited lens material is then separated. The original plate or mold is fabricated by an electron-beam lithography method (see Japanese Patent Application Laid-Open No. 1 (1989)-261601), or a wet etching method (see Japanese Patent Application Laid-Open No. 5 (1993)-303009). In these methods, the microlens can be reproduced by molding, variations between lots are unlikely to occur, and the microlens can be fabricated at a low cost. Further, the problems of alignment error and warp due to the difference in the thermal expansion coefficient can be solved, in contrast with the ion exchange method.

In the electron-beam lithography method, however, an electron-beam lithographic apparatus is expensive and a large investment in equipment is needed. Further, it is difficult to fabricate a mold having a large area more than 100 cm² (10 cm-square) because the electron beam impact area is limited.

Further, in the wet etching method, since an isotropic etching using a chemical action is principally employed, an etching of the metal plate into a desired profile cannot be achieved if composition and crystalline structure of the metal plate vary even slightly. In addition, etching will continue unless the plate is washed immediately after a desired shape is obtained. When a minute microlens is to be formed, a deviation of the shape from a desired one is possible due to an etching lasting during a period from the time a desired profile is reached to time the microlens is reached.

Further, there also exists a mold fabrication method using an electroplating technique (see Japanese Patent Application Laid-Open No. 6 (1994)-27302). In this method, an insulating film having a conductive layer formed on one surface thereof and an opening is used, the electroplating is performed with the conductive layer acting as a cathode, and a protruding portion acting as a mother mold for a lens is formed on a surface of the insulating film. The process of fabricating the mold by this method is simple, and cost is reduced. Similar such methods are also disclosed in Japanese Patent Application Laid-Open No. 8 (1996)-258051 and Japanese Patent Publication No. 64 (1989)-10169.

The problem occurring when a plated layer is formed in an opening by the electroplating technique will be described by reference to FIGS. 1A-1D and 2. FIGS. 1A-1D illustrate electroplating growth steps at the time when the electroplating is performed on an insulating body 202 with an opening 203 having a diameter φ and a cathode of an electrically-conductive body 201. FIG. 2 illustrates a cross-section of a mold shown in FIG. 1D.

During the electroplating growth process, a flat portion 210 of a plated layer 204 in the opening 203 gradually decreases as the plated layer 204 grows (FIGS. 1B and 1C), and a surface of the plated layer 204 comes to have a maximum curvature (FIG. 1D). After that, a bottom diameter Ψ of the plated layer 204 increases as the plated layer 204 grows. A radius of curvature thus increases accordingly.

Where the plated layer 204 has the flat portion as illustrated in FIGS. 1B and 1C, the illustrated structure cannot be used as a mold for a lens since image-forming cannot be achieved at a lens portion corresponding to the flat portion. According to this method, a radius of curvature near an optical axis of the lens mold increases as the diameter φ of the opening 203 increases. Where the lens mold is to be fabricated, the radius of curvature of the plated layer 204 cannot be decreased when the diameter φ of the opening is large. Thus, it is often difficult to fabricate a lens mold having a desired radius R of curvature.

Further, where a profile of the plated layer deviates from a semispherical shape as illustrated in FIG. 2, a radius S of curvature of a side surface of the plated layer differs from that R of a portion of the lens near its optical axis and positions of their curvature centers C and C' differ from each other. Thus, the curvature center C' of the side surface does not lie on the optical axis. As a result, a side surface of a microlens fabricated using such a mold cannot be used, and hence, the lens will inevitably have a small NA.

Furthermore, it is apparently difficult to precisely form a microlens with a diameter less than several hundreds of microns (particularly, less than about three hundred microns) and a radius of curvature less than 200 μm at an uppermost spherical portion, by the prior art lens fabrication techniques.

SUMMARY OF THE INVENTION

An object of the present invention is to provide a fabrication method of fabricating a microstructure (typically a microlens such as a semispherical microlens, a flyeye lens and a lenticular lens) flexibly, readily and stably, a fabrication method of a mold for forming a microstructure, a fabrication method of a microstructure using the mold, and so forth. More particularly, it is an object to provide a mold for a microlens or a microlens array which can be readily increased in size, readily fabricated with good controllability and at a relatively low cost and have a desired radius of curvature, or which has a large NA. It is an additional object to provide a fabrication method of such a mold, and a fabrication method of the microlens or the microlens array using the mold.

The present invention is generally directed to a mold for a microlens which includes a substrate at least a portion of which is conductive, such as an electrically-conductive substrate or a substrate with an electrode layer or an insulating or conductive substrate at least a portion of which is electrically conductive or insulating, respectively, an insulating mask layer formed on the substrate and including an opening or plural openings (the opening typically has a circular or slit-like shape), and a plated layer electroplated in the opening and on the mask layer. Herein, (R) is a radius of curvature of the plated layer right above the opening and at least one of (a) and (b) is met, wherein in (a) a diameter or width (φ) of the opening has a relation of $\phi \leq 0.35R$ and in (b) the diameter or width (φ) of the opening is $\phi \leq 10$ μm.

The relation of $\phi \leq 0.35R$ is especially significant when the diameter or width (φ) of the opening is above 10 μm.

Specifically, the following structures can be adopted based on the above fundamental structure.

A plurality of the plated layers are formed in and around the openings, respectively, and adjacent plated layers of the plated layers are continuously formed. The substrate can be composed of silicon, glass, quartz or a polymeric substance. Further, the mask layer may be formed of a photoresist layer.

The present invention is also generally directed to a fabrication method of a mold for a microlens including the following steps:

preparing the above substrate;

forming an insulating mask layer on the conductive portion of the substrate;

forming an opening in the mask layer to expose the conductive portion of the substrate at the opening; and performing electroplating using the conductive portion of the substrate as a cathode to deposit a plated layer in the opening and on the mask layer. When the substrate has an electrode layer, it is employed during electroplating; otherwise the conductive substrate or conductive surface of an insulating substrate is so employed.

The electroplating is performed satisfying at least one of a first condition or second condition. The first condition is that the plated layer has a flat portion formed at the beginning of the electroplating, during which a bottom diameter or width (Ψ) of the plated layer coincides with a diameter or width (φ) of the opening, and a radius (R) of curvature of the plated layer right above the opening and the diameter or width (φ) of the opening has a relation of $\phi \leq 0.35R$. The second condition is that a plated layer having a convex profile is formed at the beginning of the electroplating.

The relation of $\phi \leq 0.35R$ is especially significant when the diameter or width (φ) of the opening is above 10 μm.

It is especially significant that the diameter or width (φ) of the opening is below 10 μm in order to meet the second condition.

DESCRIPTION OF THE PREFERRED EMBODIMENTS

Various aspects of molds for forming a microlens and methods of fabricating the same of this invention will be initially described.

A plurality of the plated layers can be plated in and around the openings, respectively, and adjacent plated layers of the plated layers can be continuously formed in the electroplating step. The flyeye lens or the like can be formed using this method.

The electroplating is preferably performed while an electroplating bath is not caused to flow on the substrate in the electroplating step. A reason therefor is later described.

The electroplating can be one of nickel electroplating, copper electroplating and chrome electroplating in the electroplating step.

A step of forming a mold on the substrate with the plated layer and a step of separating the mold from the substrate can be further added to fabricate a microlens mold which has an inverted profile of the above mold.

Figure 11A:
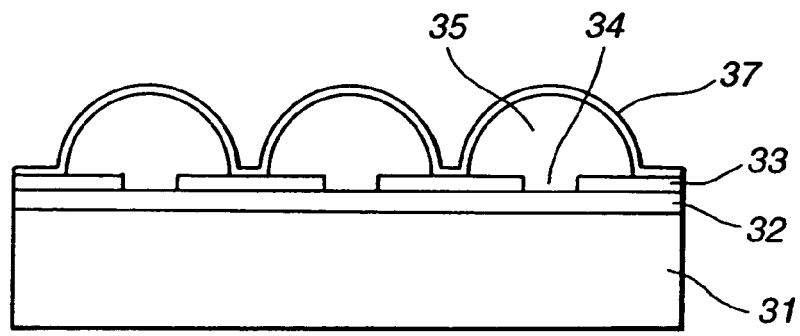
FIGS. 11A-11E are cross-sectional views illustrating fabrication steps in a method for electroplating a mold on a mold master, respectively.
Figure 11B:
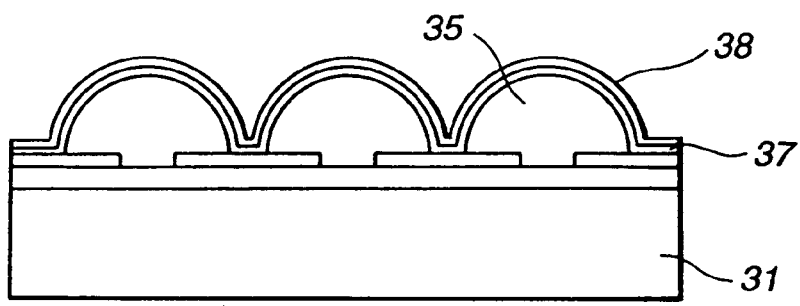
Figure 11C:
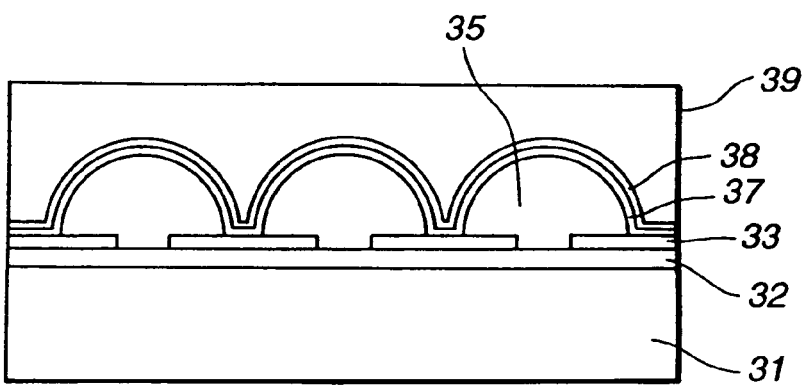
Figure 11D:
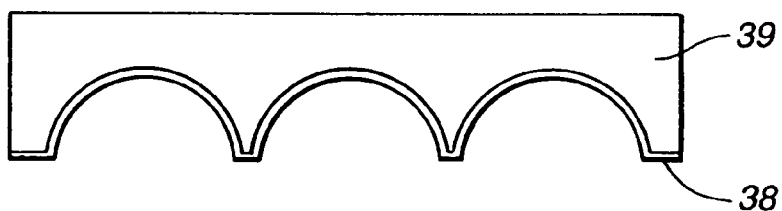
Figure 11E:
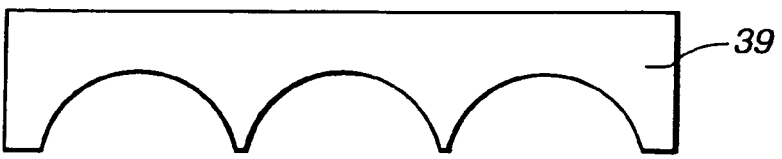

A step of forming a sacrificial layer on the substrate after the plated layer forming step can also be added. In this case, the sacrificial layer is removed to separate the mold from the substrate in the mold separating step. This process of introducing the sacrificial layer will be described with reference to FIGS. 11A-11E. A sacrificial layer 37 is formed on a mold master 31-35 fabricated by the electroplating as illustrated in FIG. 11A. A mold electrode 38 for electroplating is then formed as illustrated in FIG. 11B. The electroplating is performed using the mold electrode 38 as a cathode in the electroplating liquid containing metal ions to form a mold 39 as illustrated in FIG. 11C. After that, the sacrificial layer 37 is etched and removed such that the mold 39 with the mold electrode 38 can be separated from the substrate 31 with the plated layer 35 as illustrated in FIG. 11D. The mold electrode 38 is then etched and removed to form the mold 39 as illustrated in FIG. 11E.

In this process the mold electrode 38 is removed. However, if it is unlikely that the lens surface will be contaminated by the mold electrode 38 or that the mold electrode 38 will be damaged due to its small yield stress during the process of forming a microlens by molding, then mold electrode 38 need not be removed. The electrode 32 can be used as a sacrificial layer without forming a separate sacrificial layer 37, even though sacrificial layer 37 is shown formed on plated layer 35 and mask layer 33 in the fabrication process of FIGS. 11A-11E.

Further, between the electroplating step of FIG. 11C and the mold separating step in FIG. 11D, the electrode layer 32 may be etched and removed, and the plated layer 35 may be etched and removed. The mold 39 in FIG. 11E can be thus formed. According to this method, the fabrication time can be shortened since only the flat electrode layer 32 (not the complicated sacrificial layer 37) needs to be removed.

Furthermore, the substrate and the plated layer may be sequentially removed to separate the mold from the substrate in the mold separating step. The mold may also be mechanically separated from the substrate in the mold separating step.

In the mold forming step, the mold can be formed by electroplating or by coating mold material on the substrate with the plated layer.

In the electroplating step, size and profile of the plated layer can be controlled by controlling electroplating time and electroplating temperature. Here, plural openings may be formed in the mask layer, and the electroplating time and temperature can be controlled such that plated layers respectively corresponding to the plural openings can be continuously formed. Such a mold can be used as a mold for a flyeye lens, a lenticular lens or the like.

As the above separating method, though the mold can be mechanically separated from the substrate, the mold is likely to be deformed when the mold is large in area. Therefore, the method of sequentially etching the substrate, the mask layer and the plated layer can be adopted as described above to solve such a problem. Further, where the mold is formed after the sacrificial layer is formed on the substrate with the plated layer, the material of the sacrificial layer should be selected such that the mold cannot be corroded by an etchant for etching the sacrificial layer. When neither the plated layer nor the substrate can be corroded by the etchant for etching the sacrificial layer, the substrate with the plated layer can be employed as a master for the mold many times. In this case, a second mold needs to be fabricated by the same method only when the original mold is contaminated or damaged after plural uses thereof.

Any material, such as resin, metal and insulating substance, can be used as the material for the microlens mold so long as the material can be coated on the substrate with the plated layer and separated therefrom. As a simple fabrication method of the mold, there is a method in which metal, fused glass or glass-dissolved solution is coated on the substrate with the plated layer, and the material is separated by the above separating method after being hardened. In this case, a metal material is selected, which will neither thermally damage nor alloy the substrate and the plated layer.

The present invention is also generally directed to a fabrication method of a microlens mold using the above mold, in which lens material such as resin is coated in the microlens mold and the microlens is formed by separating the lens material from the mold.

Another lens material having a different refractive index can be coated on the above separated lens material and hardened to form a microlens.

A microlens can be formed by using the mold fabricated by the above method. Thus, microlenses or microlens arrays having the same profile can be readily formed at a relatively low cost. As material of the microlens, material readily separable from the microlens mold can be used.

Meanwhile, any material, such as metal, semiconductor (a silicon wafer or the like) and insulating substance (such as glass, quartz and polymer film), can be used as the substrate material. When the metal material is used as the substrate, there is no need to form the electrode layer. Further, when the semiconductor is used, the electrode layer is not necessarily needed if the semiconductor has enough conductivity to enable electroplating. However, where metal or semiconductor is used as the substrate, a plated layer will also be formed on a portion other than the microstructure forming portion, since the entire substrate is immersed in electroplating liquid. Therefore, when the plated layer is desired to be formed on a predetermined portion only, the insulating substance can be preferably used as the substrate. Alternatively, a metal or semiconductor, whose surface is partially insulated, may also be used.

Since the substrate is used as the mold, the substrate is preferably composed of a substrate with little waviness and low surface roughness. As the substrate, metal plate, glass substrate, silicon wafer or the like with an excellent flatness can be preferably used because the substrate has a possibility of warping due to an inner stress or thermal stress of the plated layer.

The material of the electrode layer is selected from materials which are not corrosive to the electroplating liquid used since the electrode layer is exposed to the electroplating liquid. The mask layer may be formed of any inorganic or organic insulating material that is also anticorrosive to the electroplating liquid.

When a thick electrode layer or a thick mask layer is formed on the substrate, its surface roughness may increase depending on the particular forming method. Accordingly, a thin-film forming method, such as a vacuum-evaporation method, a spin-coat method and a dip method is used as a method for forming the electrode layer and the mask layer.

A process for forming the opening in the mask layer in this case will be described. The opening is formed in the mask layer by photolithography and etching which can provide a minute or narrow opening. After the mask layer is formed, an opening pattern of photoresist is formed on the mask layer by photolithography. An opening pattern is formed in the mask layer using the photoresist as a mask. The photoresist is then removed to form a desired opening in the mask layer. A photoresist may be used as a material of the mask layer. When the photoresist is used, the etching step of the mask layer material can be omitted. Therefore, a mask layer of a photoresist is preferable.

When the electroplating is conducted, there is a possibility that the substrate will warp due to an inner stress of the plated layer or a thermal stress that may be caused when the temperature of the electroplating bath is raised for the electroplating step. There is a difference over four orders of magnitude between Young's moduli or yield stresses of resin and metal or inorganic material. Accordingly, when the mask layer of resin is formed with approximately the same thickness as the conductive layer or the plated layer, the mold is quite likely to warp. Further, when resin is used, there is the problem that the resin will swell in addition to the problem of stress. Therefore, where a mask layer of resin is used, it is preferable to form a thin mask layer, compared with the thickness of the conductive substrate or the substrate with the electrode layer.

The plated layer is formed by the deposition of metal ions in the electroplating bath caused by the electrochemical reaction. The thickness of the electroplated layer can be readily controlled by controlling the electroplating time and temperature. The following materials can be used as electroplating metal, for example. As a single metal, Ni, Au, Pt, Cr, Cu, Ag, Zn and the like can be employed. As an alloy, Cu—Zn, Sn—Co, Ni—Fe, Ni—W, Zn—Ni and the like can be used. Any material can be used so long as electroplating is possible. Ni, Cr and Cu are especially preferable as the electroplating material for the microlens mold because these metals permit a bright electroplating to be readily achieved.

Further, when forming the microstructure by electroplating, dispersion electroplating, in which dispersion particles, such as $Al_2O_3$, $TiO_2$ and PTFE, are added to the electroplating bath, can also be used. Mechanical strength and corrosion resistivity of the mold can be improved by the dispersion particles.

These advantages and others will be more readily understood from the following detailed description of certain preferred embodiments in conjunction with the drawings.

A first embodiment of a fabrication method of a mold for a microlens will be described with reference to FIGS. 3A-3E and 4-7. In the method of the first embodiment, a plated layer has a flat portion when electroplating is carried out in an opening during an initial electroplating growth step. FIG. 4 illustrates an electroplating apparatus used in the first embodiment. In FIGS. 3A-3E and 4, reference numeral 1 denotes a substrate, reference numeral 2 denotes an electrode layer, reference numeral 3 denotes a mask layer, reference numeral 4 denotes an opening, reference numeral 5 denotes a plated layer, reference numeral 21 denotes a base, reference numeral 22 denotes an anode plate, reference numeral 23 denotes an electroplating bath containing metal ions, and reference numeral 24 denotes an external power source.

The structure of a substrate used in a step illustrated in FIG. 3A will be described. The electrode layer 2 is formed on the substrate 1, and the mask layer 3 is then formed thereon. Where the substrate 1 is composed of electrically-conductive substrate material, there is no need to form the electrode layer 2.

The opening 4 is then formed in the mask layer 3. Here, the opening 4 has a circular shape. The substrate 1 with the opening 4 acting as the base 21 is immersed in the electroplating bath 23 containing metal ions of the electroplating apparatus illustrated in FIG. 4. The base 21 and the anode plate 22 are connected to the power source 24 to cause a current flow through the bath 23 and form the plated layer 5 in the opening 4. Thus, the plated layer 5 is initially formed in the opening 4 as illustrated in FIG. 3B. Herein, no flow of the electroplating liquid 23 is caused to occur near the opening 4 during the electroplating process. If the electroplating liquid flows near the opening 4 when the plated layer 5 is grown in the minute opening 4, an electroplating growth rate on a downstream side of the flow will be larger than that on an upstream side of the flow, and hence, the plated layer 5 will grow asymmetrically with respect to a center of the opening 4. The structure including such an asymmetrical plated layer cannot be used as a microlens mold.

As a method of preventing flow in the electroplating liquid 23, there is a method of performing no stirring of the electroplating liquid during the electroplating. In another method a mesh is provided near the substrate to allow diffusion of the electroplating liquid, but prevents the flow thereof. In particular, the non-stirring method is simple and convenient. This non-stirring method is used in the first embodiment.

At the beginning of the electroplating growth, i.e., while a bottom diameter $\Psi$ of the plated layer 5 is equal to the opening diameter $\phi$ and no plated layer grows on the mask layer 3, the plated layer 5 is deposited in the opening 4 only. At this time, the plated layer 5 is caused to deposit in such a way that the plated layer 5 has a flat portion which is not a concave surface. That is, conditions such as an applied voltage are regulated to achieve the above situation.

Figure 1A:
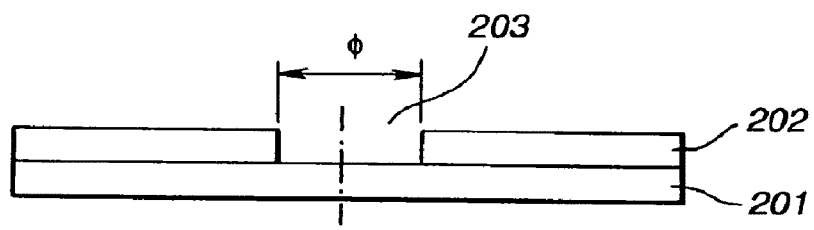
FIGS. 1A-1D are cross-sectional views illustrating prior art electroplating growth steps, respectively.
Figure 1B:
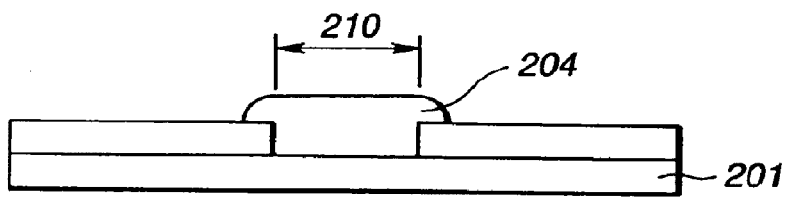
Figure 1C:
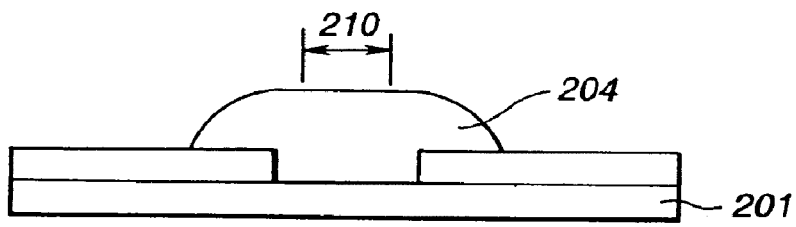
Figure 1D:
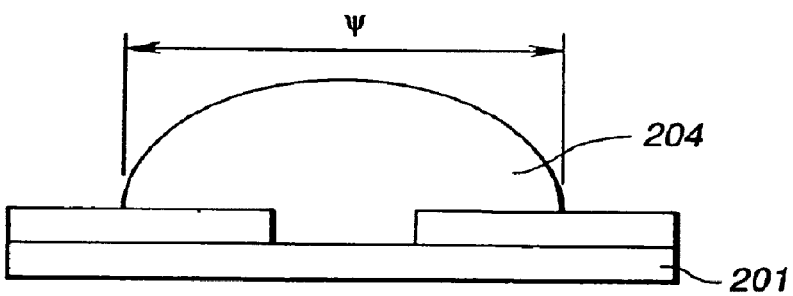
Figure 2:
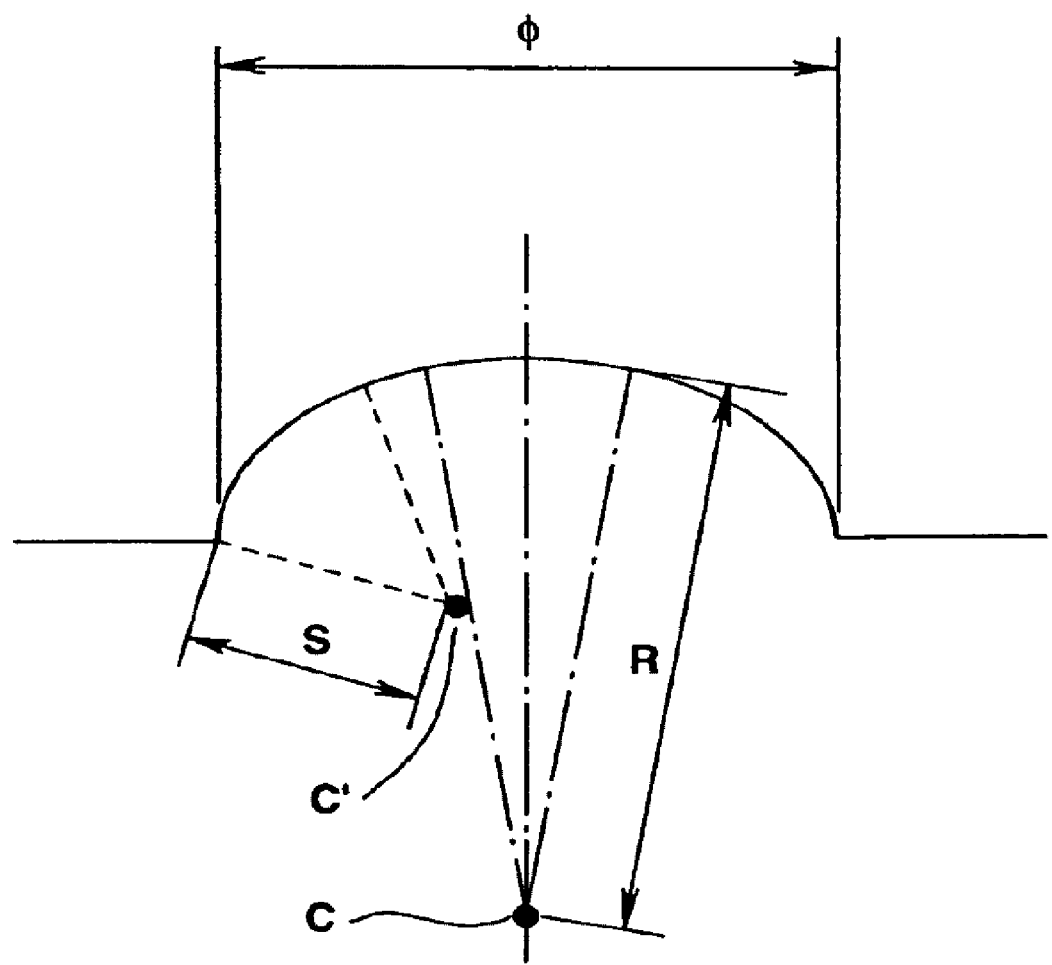
FIG. 2 is a cross-sectional view illustrating a radius of curvature of a plated layer.
Figure 3A:
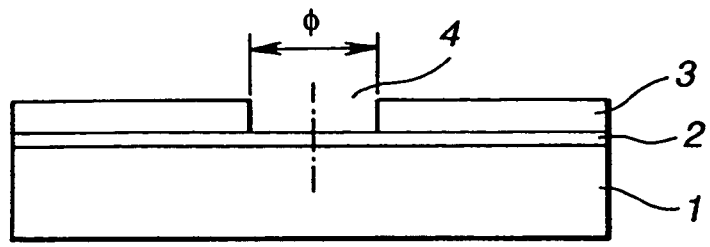
FIGS. 3A-3E are cross-sectional views illustrating electroplating growth steps in a fabrication method of a microlens mold of a first embodiment according to the present invention, respectively.
Figure 3B:
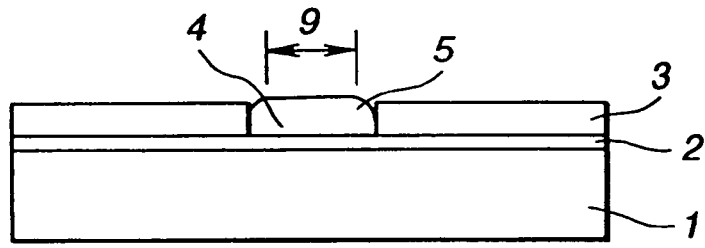
Figure 4:
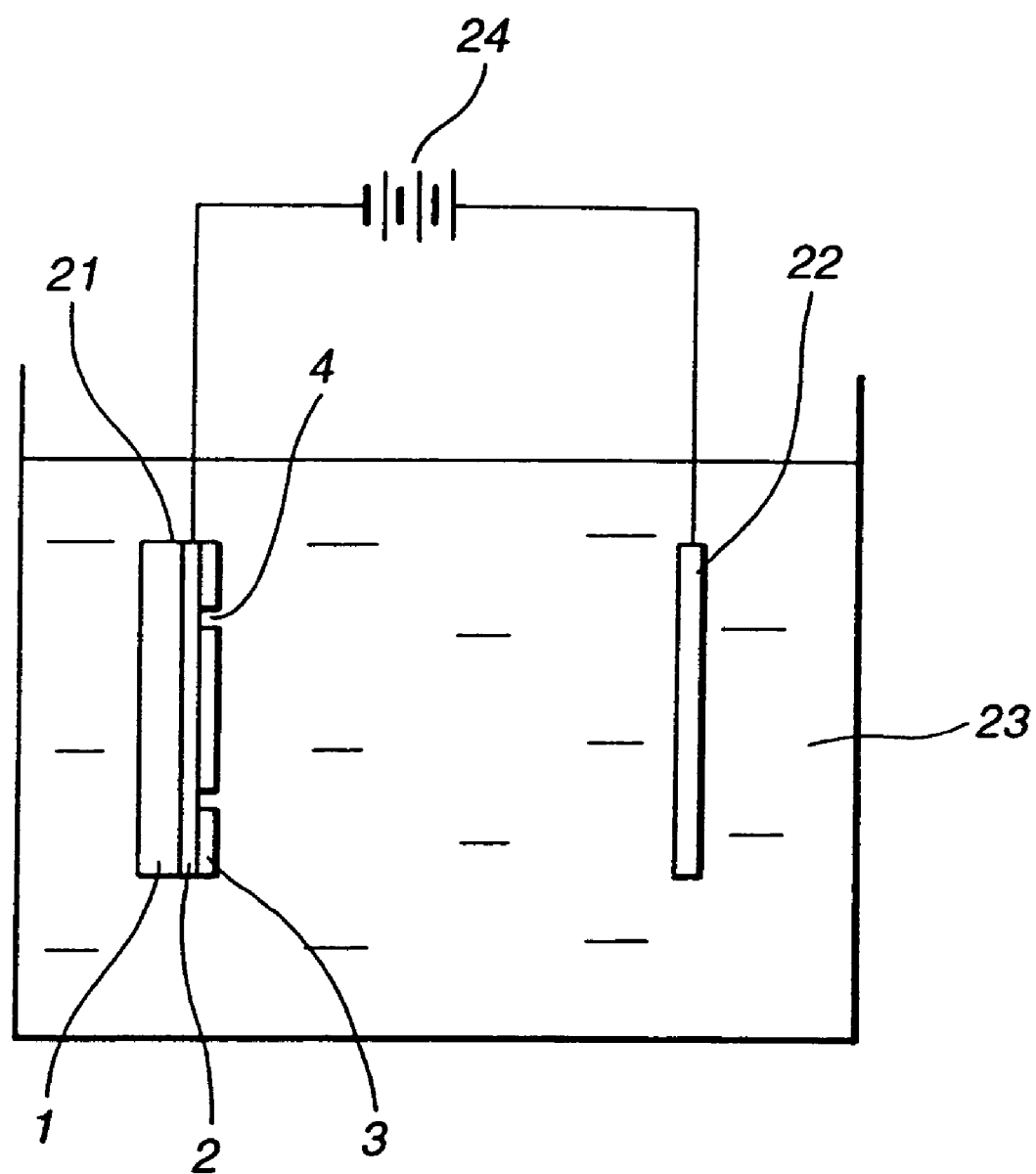
FIG. 4 is a cross-sectional view illustrating an electroplating apparatus used in the present invention.

Ordinarily, since a current density is relatively large at a side portion of the electrode during the electroplating, the electroplating tends to occur strongly at an edge face of the opening 4 when a cathode has a form (an exposed portion of the conductive electrode layer 2) as illustrated in FIG. 3A. Hence, there is a possibility that the plated layer has a concave surface at the beginning of the electroplating. In the plated layer with such a concave surface, the concave portion remains near the optical axis (a portion right above the opening 4) even if the electroplating growth is continued. The electroplating growth needs to be continued for quite a long time until the plated layer with an approximately semispherical profile is reached. In such a case, it proves impossible to fabricate a microlens mold with a desired radius of curvature near its optical axis. As is evident from the above, the plated layer 5 formed in the opening 4 needs to have a convex profile including the flat portion to achieve the fabrication of a preferable microlens mold by electroplating.

Figure 3C:
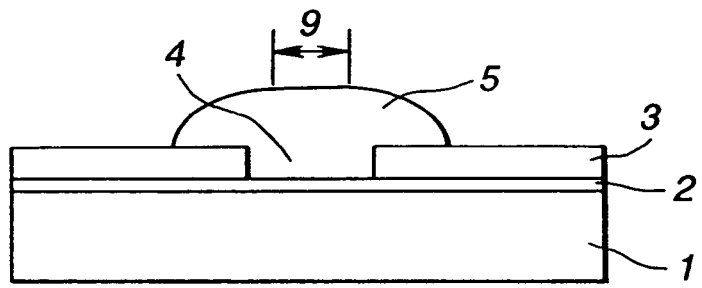
Figure 3D:
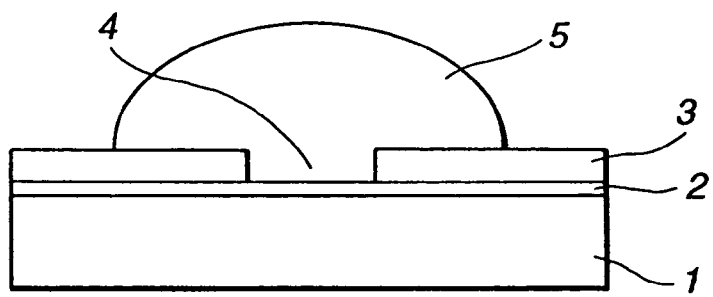
Figure 3E:
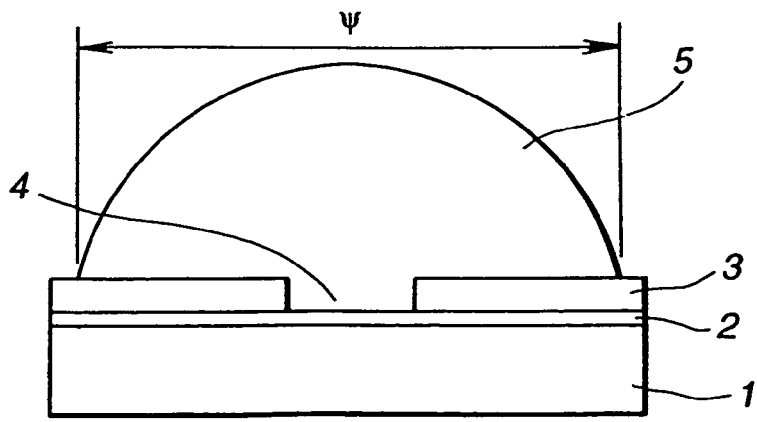

As the electroplating is continued, the plated layer 5 extends onto the mask layer 3 as illustrated in FIG. 3C and the flat portion becomes smaller than that at the beginning of the electroplating. As the electroplating growth is further continued, the flat portion disappears. A curvature thus appears at a portion of the mold on the optical axis, i.e., a portion right above the opening 4, as illustrated in FIGS. 3D and 3E. The plated layer 5 with an approximately semispherical profile is hence formed. Where the electroplating is effected at the opening 4 in the electroplating liquid containing metal ions, metal ions in the electroplating liquid 23 move toward the plated layer 5, and hence, deposition of the electroplating proceeds with its growth direction being isotropic.

With the mold for a microlens to be fabricated according to the above-discussed method, an experiment was carried out using parameters, such as the electroplating bath and electroplating conditions, in order to obtain a microlens mold having a desired radius R of curvature on its optical axis. It was found that the diameter $\phi$ of the opening 4 should meet the following condition to obtain a desired R when the plated layer 5 with the flat portion was formed during the initial electroplating growth ($\Psi = \phi$) and the electroplating was continued ($\Psi \geq \phi$), where $\Psi$ is the bottom diameter of the plated layer 5 and $\phi$ is the diameter of the opening 4:

$$\phi \leq 0.35 R \quad (1).$$

In other words, where the opening 5 has a predetermined diameter $\phi$, the plated layer 5 grown by the electroplating has a minimum radius $R_{min}$ of curvature. Accordingly, the opening 4 with a diameter meeting the relation (1) needs to be formed to obtain a microlens mold having a predetermined radius R of curvature.

Thus, the relation (1) showing a relation between an opening diameter or width and a minimum radius of curvature is found in this invention. With an opening diameter or width $\phi$ outside the above condition, a plated layer with a desired radius of curvature cannot be readily obtained, although this also depends on the electroplating bath and electroplating conditions.

The minimum radius of curvature in the relation (1) will be described with reference to FIG. 5. The radius of curvature is determined in the following manner.

A mask layer with a plurality of openings is formed on a substrate, and electroplating is performed by using the substrate as a cathode and the electroplating apparatus as illustrated in FIG. 4. A surface profile of a portion right above the opening in a thus-formed plated layer is measured, and its result is reduced to a radius of curvature. A half of the bottom diameter $\psi$ of the plated layer 5 illustrated in FIG. 3E is used as a parameter for indicating the electroplating growth time when the relation between the electroplating growth time and the radius of curvature is desired.

Figure 5:
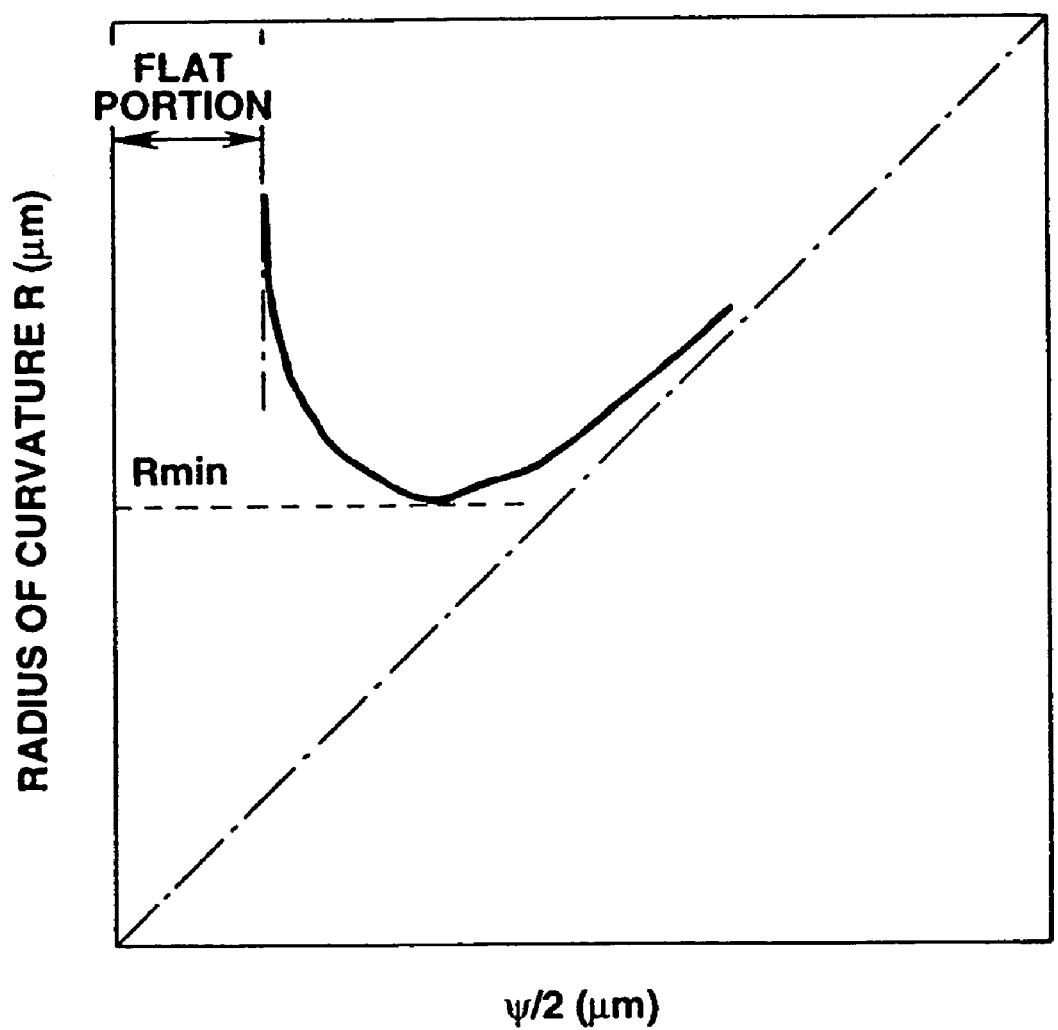
FIG. 5 is a graph illustrating a minimum radius of curvature of a plated layer.

As illustrated in FIGS. 3B and 3C, there is the flat portion on the portion of the plated layer 5 right above the opening 4 at these time periods of the electroplating growth, and therefore, no curvature exists (these time periods are indicated by a flat portion in FIG. 5). As the electroplating growth proceeds, the flat portion disappears and the plated layer 5 in turn develops a radius of curvature. As the electroplating is further continued, the radius of curvature of the plated layer 5 decreases and takes the minimum radius R of curvature as illustrated in FIG. 5. Thereafter, as the electroplating growth proceeds still further, the plated layer 5 expands in size. Accordingly, the radius of curvature of the plated layer 5 gradually increases. The minimum radius R of curvature depends on the diameter of the opening 4. The minimum radius R of curvature increases as the diameter of the opening 4 increases. Thus, at a predetermined diameter of the opening 4, the plated layer 5 has a minimum radius R of curvature.

Experiments for finding conditions enabling the establishment of the relation as illustrated in FIG. 5 were performed using Ni electroplating and Cu electroplating. As an electroplating bath which can duly achieve a bright electroplating (electroplating for forming a bright layer), a Watts bath was used in the Ni electroplating. An electroplating bath of copper sulfate electroplating was used in the Cu electroplating. The composition of the Watts bath was a water solution to which a brightener was added. This water solution consisted of the compounds—nickel sulfate hexahydrate, nickel chloride hexahydrate and boric acid—with their respective weight ratio per liter being 270:40:40. The temperature of the electroplating bath was set at 55° C., and the Ni electroplating was performed under a constant voltage (an applied voltage is 1 V).

In the Cu electroplating, the composition of the bath was a water solution, to which hydrochloric acid at a concentration of 0.04 ml/l, was added. This water solution consisted of copper sulfate pentahydrate and sulfuric acid with their respective weight ratio per liter being 200:50. The temperature of the electroplating bath was set at 55° C., and the Cu electroplating was performed under a constant voltage (an applied voltage is 0.3 V) as a bright condition (condition for forming a bright Cu layer).

As another Ni electroplating bath, a sulfamic acid bath was used, and the electroplating was performed under the same condition as that of the Watts bath. Herein, an electroplating bath available in a market was used (product name: Microfab Ni100 produced by Nippon Electroplating Engineers Com.).

Herein, the voltage satisfies the condition that the plated layer 5 at the beginning of the electroplating has a flat portion, which is not concave, in the opening 4 and bright electroplating can be achieved. The surface profile was measured by a surface-shape measuring function which is one of the functions of a confocal scanning laser microscope (a sample is moved to an objective lens side, and the maximum luminance position is measured during this move). A measurement range is equal to a length of the opening diameter.

The same substrate 1 was used irrespective of the electroplating bath. This substrate will be described as follows. A silicon wafer was thermally oxidized using an oxidizing gas, and layers of silicon dioxide with a thickness of 1 μm were formed on opposite surfaces of the wafer. This wafer was used as the substrate 1 illustrated in FIGS. 3A-3E. Cr and Au were continuously layered with thicknesses of 10 nm and 200 nm on the above wafer, respectively, using an electron beam vacuum-evaporation method which is one of thin-film forming methods. The electrode layer 2 was thus formed. Aromatic polyamide acid solution was then spin-coated and this coating was thermally treated to form the mask layer 3 of polyimide.

Further, coating, exposure and development of photoresist were conventionally performed using photolithography to form an opening in the resist. The mask layer 3 at the resist opening was etched by a reactive ion etching using oxygen. Thus, the electrode layer 2 was exposed and the opening 4 was formed. The photoresist was removed thereafter.

As formed, the opening 4 has a circular shape. Measurements were carried out with opening diameters of 20 μm, 40 μm and 80 μm since the plated layer formed at the beginning of the electroplating in an opening with a diameter less than 10 μm could not have a flat portion. The opening diameter $\phi$ had to be above 10 μm to form the flat portion in the plated layer 5 formed at the beginning of the electroplating.

Figure 6:
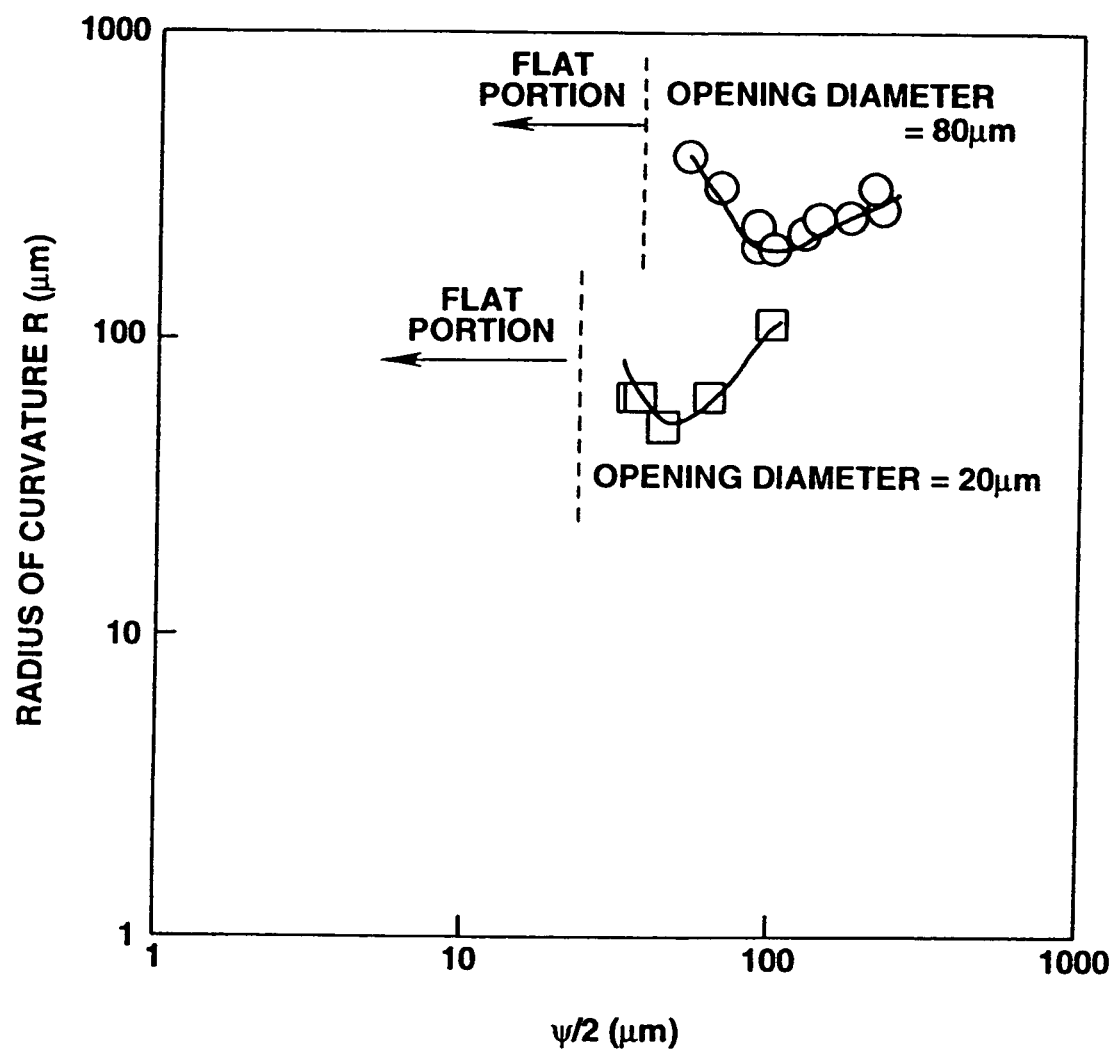
FIG. 6 is a graph illustrating experimental results of radii of curvature near the optical axis of plated layers and bottom diameters of plated layers in the first embodiment.

FIG. 6 shows results with respect to the opening diameters 20 μm and 80 μm obtained in the Ni electroplating using the Watts bath. Plated layers 5 having different bottom diameters Ψ were formed on mask layers 3 with openings having the same diameter by varying electroplating time, respectively. Radii of curvature of the plated layers 5 right above the openings 4 on the optical axis were measured, and the minimum radius $R_{min}$ of curvature was thus obtained. The minimum radius $R_{min}$ of curvature was about 190 μm when the opening diameter was 80 μm, and the minimum radius $R_{min}$ of curvature was about 50 μm when 20 μm.

Figure 7:
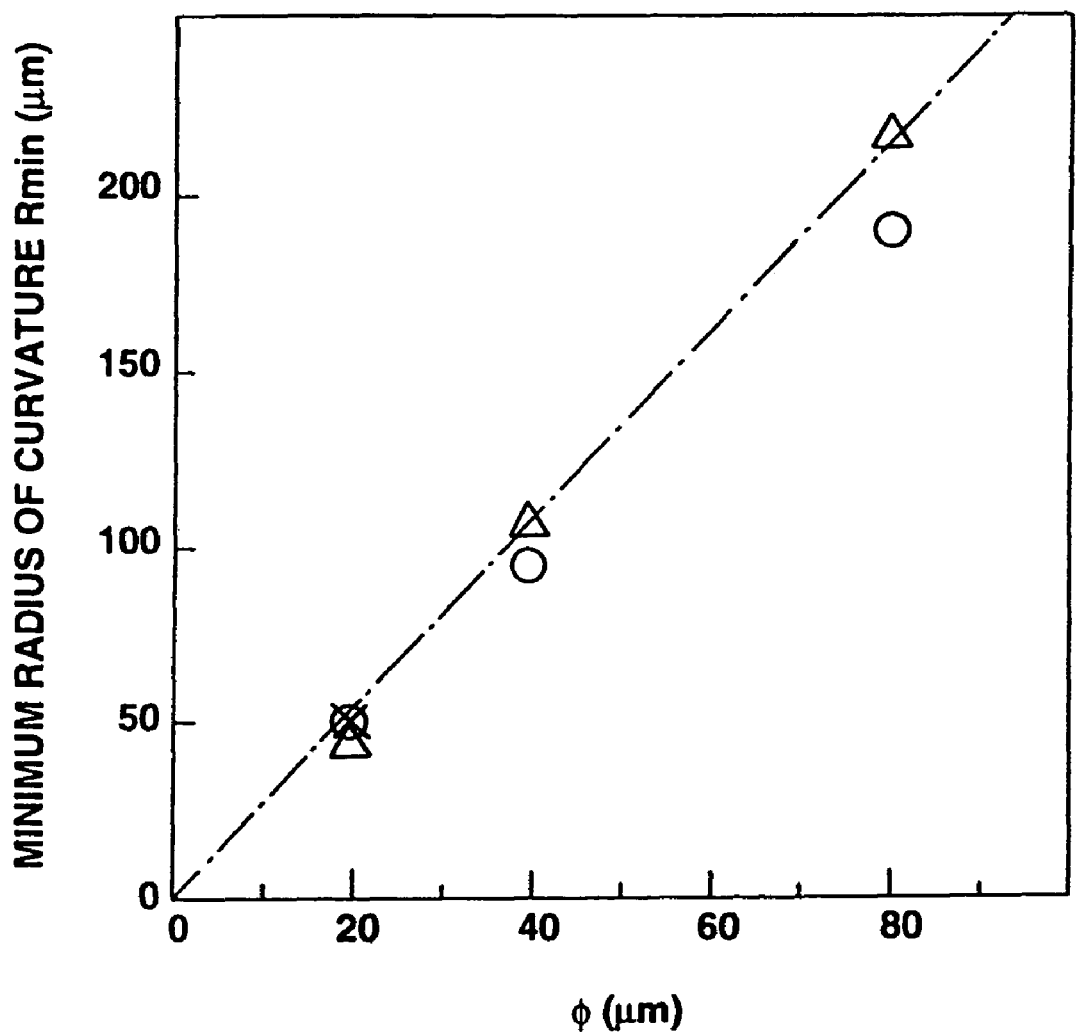
FIG. 7 is a graph illustrating results of minimum radii of curvature and opening diameters φ in the first embodiment.

FIG. 7 shows the relationship between the minimum radius $R_{min}$ of curvature and the opening diameter $\phi$ obtained by the Ni electroplating and the Cu electroplating according to the above method. Results obtained using the opening diameters of 20 μm, 40 μm and 80 μm are shown in the Ni electroplating (indicated by a circle in FIG. 7) and the Cu electroplating (indicated by a triangle in FIG. 7), while the result obtained using the opening diameter of 20 μm is shown in the sulfamic acid bath (indicated by a crisscross in FIG. 7). No great difference could be seen in the minimum radius $R_{min}$ of curvature even when the electroplating bath differed. From the results it is possible to obtain radii of curvature lying in a region above a dotted line in FIG. 7 (which represents the relation of $\phi=0.35 R$) when the opening diameter $\phi$ is set to a given value, independently of the kind of the electroplating bath. This means that the opening diameter $\phi$ should satisfy the relation (1) to obtain a desired radius R of curvature.

In comparison with the above, with the opening diameter $\phi$ of 80 μm, the plated layer was formed by the nickel (II) sulfamate bath under the condition that the plated layer had a concave shape at the beginning of the electroplating. The concave profile of the plated layer remained even when the electroplating growth was continued until Ψ/2 shown in FIG. 6 reached 200 μm. Due to the concave profile of the plated layer, the thus-formed structure cannot be used as a microlens mold.

It was found through the above experiments that no difference in the minimum radius $R_{min}$ of curvature appears even if the pitch or number of the openings varies. Further, the result of the relationship between the radius of curvature and Ψ/2 does not differ from the above even when a current flowing at the beginning of the electroplating under a voltage condition is measured and then the electroplating is continued under a constant current based on this measured amount of current.

Accordingly, where the plated layer has a flat portion when the plated layer is formed in the opening at the beginning of the electroplating growth, a microlens mold comprised of a substrate with the plated layer having a desired radius of curvature on its optical axis can be fabricated by meeting the relation (1).

In fabricating a microlens mold of this invention, an undesired profile error caused by over-etching proceeding until the washing step is conducted can be prevented. The deposition of the plated layer can be terminated when desired by terminating the current flowing between the anode and the cathode. Current flow is thus ended at the point where a desired profile is obtained. This contrasts with the method of forming a mold by etching, where etching proceeds until the washing step, thus causing a profile error. Accordingly, controllability of the fabrication is superior to the prior art method.

Further, the mold can be directly formed by electroplating. Therefore, no expensive equipment is needed, fabrication costs can be reduced, and the size of the mold can be enlarged readily. Furthermore, the size of the plated layer can be controlled in situ, and the lens diameter and the like can be readily and precisely controlled by controlling electroplating time and temperature. When a plurality of openings are formed in the mask layer, a mold for a microlens array can be fabricated by the same method as above.

Figure 13A:
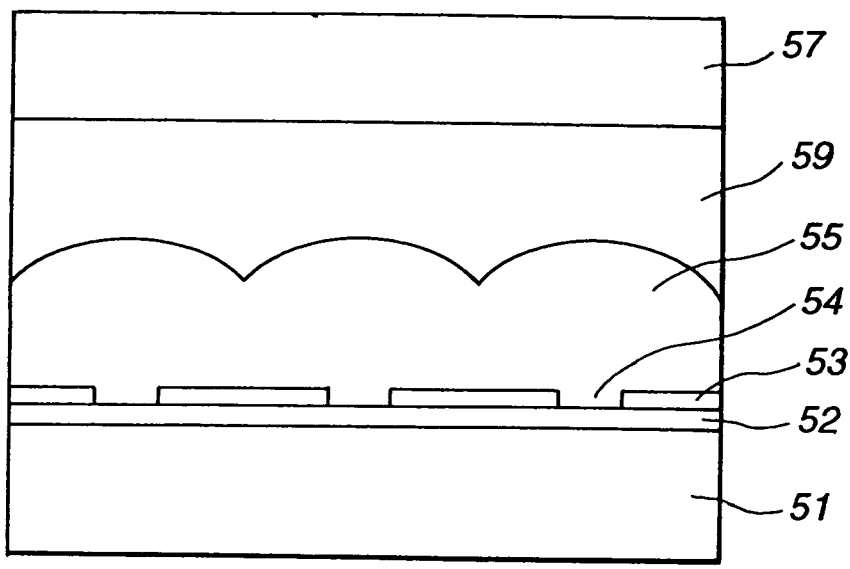
FIGS. 13A-13C are cross-sectional views illustrating fabrication steps in another method for fabricating a microlens array according to the present invention, respectively.
Figure 13B:
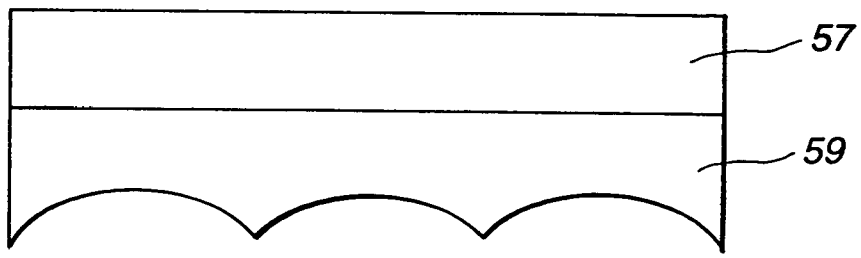
Figure 13C:
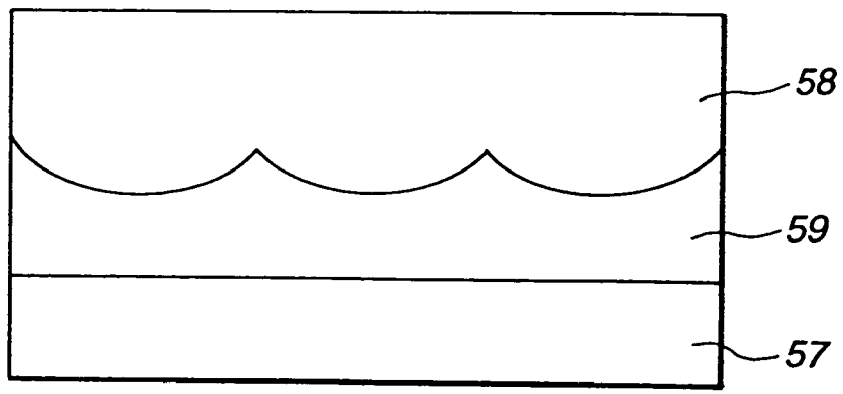

A process of fabricating a microlens using the above mold will now be described. Initially, an example of using the fabricated structure as a mold (not a mold master) for a microlens will be described with reference to FIGS. 13A-13C. In FIGS. 13A-13C, reference numeral 51 denotes a substrate, reference numeral 52 denotes an electrode layer, reference numeral 53 denotes a mask layer, reference numeral 54 denotes an opening, reference numeral 55 denotes a plated layer, reference numeral 57 denotes a glass layer, reference numeral 58 denotes a resin having a large refractive index, and reference numeral 59 denotes an ultraviolet-ray curing resin. The microlens mold has a convex shape, and the plated layer 55 extends continuously as illustrated in FIG. 13A. The ultraviolet-ray curing resin 59 is laid over the mold fabricated by the above method. The glass layer 57 is then placed on the resin 59, and the resin 59 is exposed to ultraviolet rays through the glass 57 to cure the resin 59. After that, the glass 57 and the resin 59 are separated from the mold. Thus, a concave microlens is obtained. The concave microlens has the resin with an inverted profile of the plated layer 55 on the glass 57 as illustrated in FIG. 13B.

The resin 58 is then coated on the concave microlens, and the resin 58 is hardened and flattened. A complete microlens structure can be thus produced as illustrated in FIG. 13C.

In such a method of fabricating a microlens, alkaline glass is not necessarily required. Limitations to materials used for the microlens and for the support substrate are lowered, in contrast with the ion exchange method.

The above concave microlens may be fabricated by other methods, such as a method in which a conventional thermoplastic resin is used and a heated mold is stamped on this resin, a method in which a thermosetting resin is laid over a mold and then heated to be hardened, and a method in which an electron-beam curing resin is coated on a mold and the resin is hardened by electron beam irradiation.

An example of using the fabricated structure as a mold master (not a mold) for a microlens will be described. An electrode for electroplating a mold thereon is formed on a mold master for a microlens, and an electroplating material is electroplated on the electrode for electroplating a mold to form a microlens mold. The electroplating material differs from a material used for the fabrication of the mold master. The mold is then separated from the mold master to obtain a concave mold for a microlens (see FIGS. 11A-11E illustrating the example using the sacrificial layer).

Figure 12A:
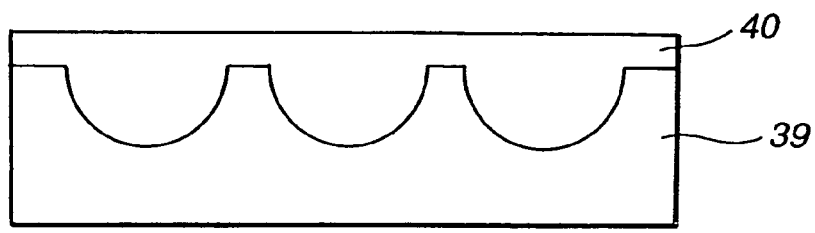
FIGS. 12A-12C are cross-sectional views illustrating fabrication steps in a method for fabricating a microlens array according to the present invention, respectively.
Figure 12B:
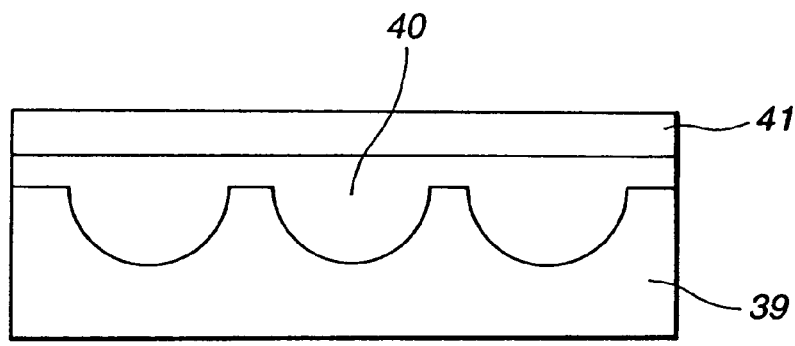
Figure 12C:
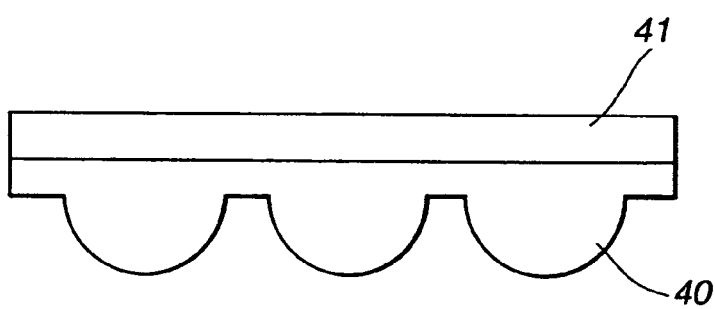

An example of the fabrication process of a microlens using this concave mold will be described with reference to FIGS. 12A-12C. A resin 40, such as an ultraviolet-ray curing resin, thermosetting resin or electron-beam curing resin, is coated on a concave mold 39, and after a support substrate 41 is laminated on resin 40, resin 40 is hardened by ultraviolet rays, heat or electron beam radiation. The resin 40 and the substrate 41 are then separated from the mold 39 to obtain a microlens. A convex microlens can also be fabricated by stamping a heated mold on thermoplastic resin.

A second embodiment of a fabrication method of a mold for a microlens will be described with reference to FIGS. 4, 8A-8D, 9 and 10. In the method of the second embodiment, a plated layer has a convex portion when electroplating is carried out in an opening during an initial electroplating growth step. In FIGS. 8A-8D, reference numeral 11 denotes a substrate, reference numeral 12 denotes an electrode layer, reference numeral 13 denotes a mask layer, reference numeral 14 denotes an opening, and reference numeral 15 denotes a plated layer.

Figure 8A:
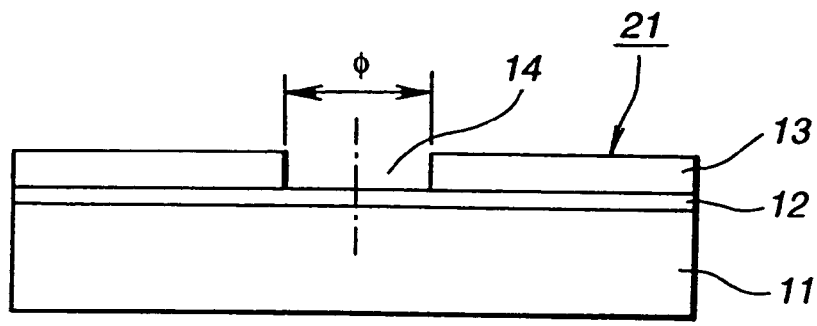
FIGS. 8A-8D are cross-sectional views illustrating electroplating growth steps in a fabrication method of a microlens mold of a second embodiment according to the present invention, respectively.

The structure of substrate 11 illustrated in FIG. 8A will be described. The electrode layer 12 is formed on the substrate 11, and the mask layer 13 is then formed thereon. Where the substrate 11 is composed of electrically-conductive material, there is no need to form electrode layer 12.

Figure 8B:
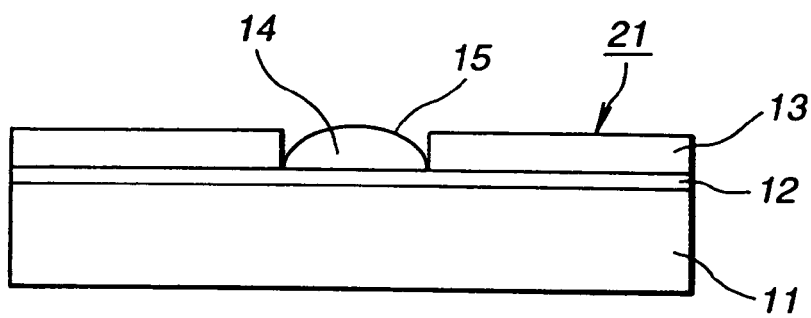

Opening 14 is then formed in the mask layer 13. Here, the opening 14 has a circular shape with a diameter $\phi$. The substrate 11 with the opening 14 acting as the base 21 is immersed in the electroplating bath 23 containing metal ions of the electroplating apparatus illustrated in FIG. 4. The base 21 and the anode plate 22 are connected to the power source 24 to cause a current flow through the bath 23 and form the plated layer 15 in the opening 14. Thus, the convex plated layer 15 is initially formed in the opening 14 as illustrated in FIG. 8B. Herein, no flow of the electroplating liquid 23 occurs near opening 14 during the electroplating process. The reason and method therefor are described in the first embodiment. Also in this embodiment, a non-stirring electroplating method is used.

Figure 8C:
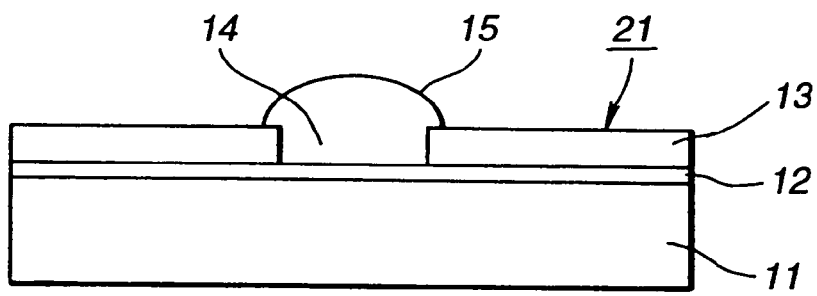
Figure 8D:
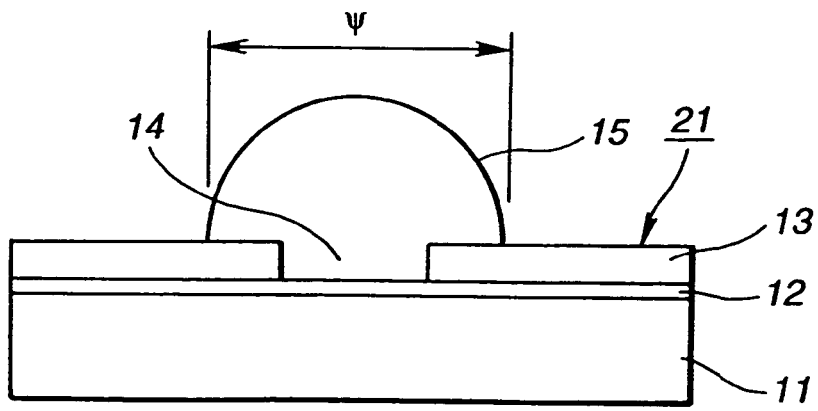

As the electroplating proceeds, the plated layer 15 extends onto the mask layer 13 as illustrated in FIG. 8C, and the plated layer 15 with a curvature reflecting the convex profile at the beginning of the electroplating growth is formed. As the electroplating growth is further continued, the plated layer 15 develops a semispherical profile as illustrated in FIG. 8D. A semicylindrical profile can be reached when the opening has a slit-like shape. Where the electroplating is carried out at a minute opening in the electroplating liquid containing metal ions, the metal ions move toward the plated layer, and hence, deposition of the electroplating proceeds with its growth direction being isotropic.

With the microlens mold to be fabricated according to the above-discussed method of the second embodiment, an experiment was carried out controlling parameters such as electroplating bath and electroplating conditions in order to obtain a mold having a minute semispherical profile. The condition for obtaining the initial convex plated layer 15 without the flat portion was determined when the plated layer was formed in the opening at the beginning of the electroplating growth (when $\Psi=\phi$). It was found that the diameter $\phi$ in this case should meet the following condition:

$$\phi \leq 10\ \mu m \qquad (2).$$

When $\Psi=\phi$, the electroplating on a convex top portion of the plated layer 15 can be facilitated by making the initial plated layer 15 convex. As the plated layer 15 further grows, the plated layer 15 rapidly develops a semispherical profile. As a result, no difference appears between a radius of curvature on a side surface of the plated layer 15 and a radius of curvature near its optical axis, and hence, a side portion of a microlens to be fabricated by the above mold can be used. Thus, a microlens with a large NA can be provided.

Where a semispherical profile needs to be obtained when $\phi>10\ \mu m$, the following is required as described in the first embodiment. The flat portion is formed at the beginning of the electroplating ($\Psi=\phi$), and the plated layer is grown such that an approximately semispherical profile can be reached after the flat portion disappears. After that, the electroplating growth needs to be further continued. Therefore, in the method of the first embodiment, the radius of curvature of the mold inevitably becomes relatively large. Accordingly, a microlens with a very minute radius of curvature (for example, less than 30 $\mu m$) is difficult to obtain.

A microlens with a very minute radius of curvature can be provided when the above condition of the second embodiment is met. Further, since a semispherical profile can be obtained at the beginning of the electroplating, a microlens mold with a relatively large radius of curvature can also be achieved by further continuing the electroplating growth.

Figure 9:
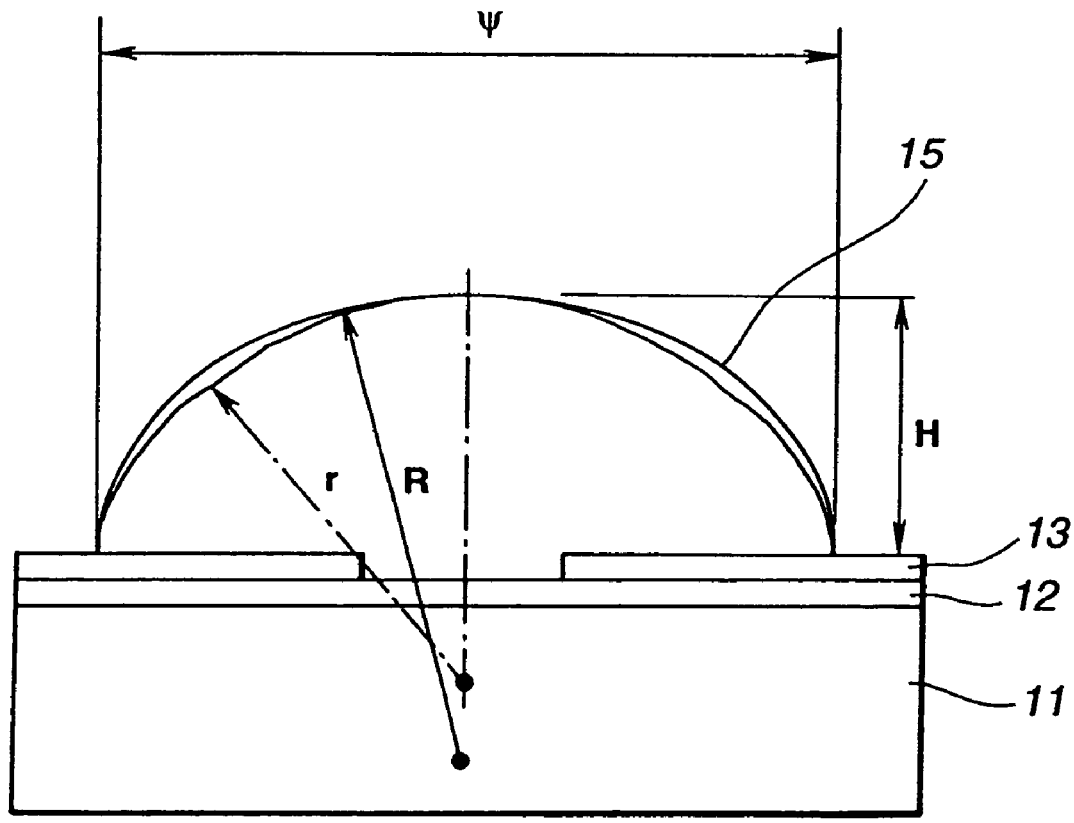
FIG. 9 is a view illustrating an estimation method of a semispherical profile in the second embodiment.

Measurement of the radius of curvature and estimation of the semispherical profile will be described with reference to FIG. 9. A mask layer with a plurality of openings is formed on a substrate, electroplating is performed by using the substrate as a base and the electroplating apparatus as illustrated in FIG. 4, and the radius of curvature is obtained by measuring a profile of the thus-formed plated layer right above the opening. More specifically, the radius of curvature of the microlens near its optical axis is determined by its surface profile, and a radius R of curvature in FIG. 9 is thus obtained. The surface profile is measured by the surface-shape measuring function which is one of the functions of the confocal scanning laser microscope. A measurement range is equal to a length of the opening diameter.

On the other hand, a virtual radius r of curvature indicated by a dotted line in FIG. 9 is calculated from a layer thickness H and a bottom diameter $\Psi$ of the plated layer 15 (these H and $\Psi$ are measured), on the assumption that the plated layer 15 has a semispherical profile. The radius r can be calculated as follows:

$$r = (\Psi \cdot \Psi/4 + H \cdot H)/2 \cdot H \quad (3).$$

When the radius of curvature of a side of the plated layer 15 is equal to the radius of curvature near the optical axis, the radius R of curvature coincides with the virtual radius r of curvature and it can be hence said that the plated layer 15 has a semispherical profile. Conversely, it can be said that the plated layer 15 has a semispherical profile when the radius R of curvature coincides with the virtual radius r of curvature. A usable area of the lens can be thus expanded.

An experiment for finding conditions meeting those requirements was performed using Ni electroplating and Cu electroplating. As an electroplating bath that relatively readily achieves the bright electroplating, the Watts bath was used in the Ni electroplating. The electroplating bath of copper sulfate electroplating was used in the Cu electroplating. The composition of the Watts bath was a water solution to which the brightener was added. This water solution consisted of nickel (H) sulfate hexahydrate, nickel (II) chloride hexahydrate and boric acid at a weight ratio per liter of 270:40:40, respectively. The temperature of the electroplating bath was set to 55° C., and the Ni electroplating was performed under a constant voltage (an applied voltage is 1 V).

In the Cu electroplating, the composition of the bath was a water solution to which hydrochloric acid of 0.04 ml/l was added. This water solution consisted of copper (II) sulfate pentahydrate and sulfuric acid at a weight ratio per liter of 200:50. The temperature of the electroplating bath was set to 55° C., and the Cu electroplating was performed under a constant voltage (an applied voltage is 0.3 V) as a bright condition of the plated layer. The above voltage is a voltage for achieving the convex plated layer 15 in the opening 14 in the initial electroplating step ($\phi=\Psi$) and the bright electroplating.

The same substrate 11 was used irrespective of the kind of the electroplating bath. This substrate will be described. The formation of the substrate 11 is the same as the substrate 1 in the first embodiment, except for the size of the opening 14.

Herein, the opening 14 has a circular shape. Measurements were carried out using opening diameters of 5 μm and 10 μm. As a comparison therewith, the same measurement was performed using an opening diameter of 20 μm.

Figure 10:
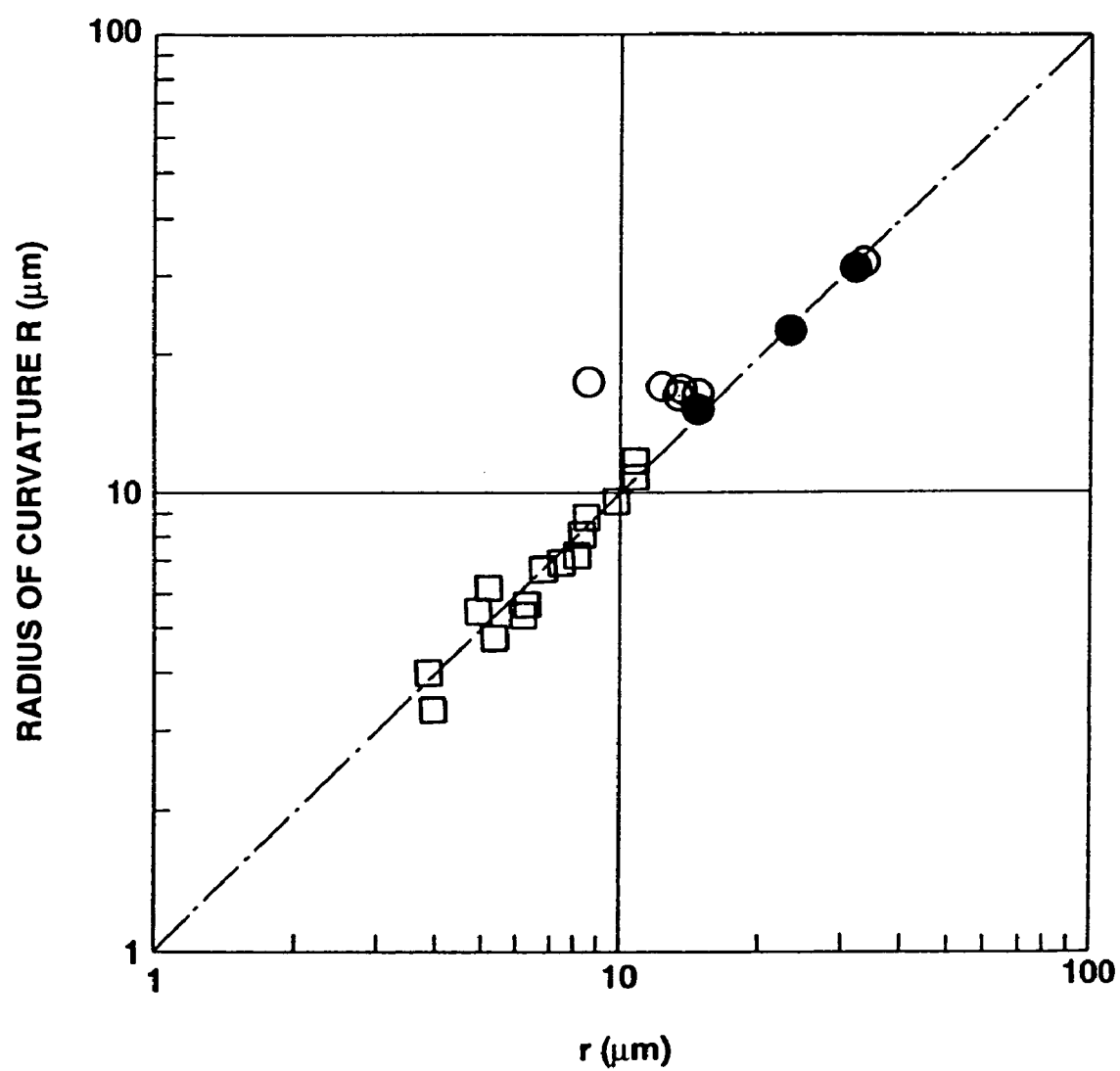
FIG. 10 is a graph illustrating results of radii R of curvature near the optical axis of plated layers right above openings and virtual radii r of curvature in the second embodiment.

FIG. 10 shows results of measurements of the virtual radius of curvature and the radius of curvature R of the plated layer right above the opening 14 on the optical axis, in which substrates with plated layers having different radii were obtained in the Ni electroplating using the Watts bath and the Cu electroplating bath by varying electroplating times, respectively. In FIG. 10, a dotted line indicates R=r, black circles indicate the Cu electroplating bath ($\phi=10$ μm), blank circles indicate the Watts bath ($\phi=10$ μm), and blank squares indicate the Watts bath ($\phi=5$ μm). As is known from the case of the opening diameter $\phi$ of 10 μm, r=R in a range of r>20 μm in this case, irrespective of the electroplating bath. In the case of the opening diameter of 5 μm, r=R at an early stage when r only reaches about 4 μm.

As a comparative case, the same measurement was conducted using the opening diameter of 20 μm in which the plated layer had the flat portion at the beginning of the electroplating growth ($\Psi=\phi$). In the plated layer of this microlens mold, r was not coincident with R even when r=70 μm.

As a comparative case of the voltage condition, the plated layer was formed in the opening with a diameter of 10 μm under a voltage of 3 V, using the Watts bath. In this case, the plated layer was concave at the beginning of the electroplating growth ($\Psi=\phi$), and the concave profile remained in the plated layer above the opening even when the bottom diameter of the plated layer reached 55 μm during the following electroplating.

The results will be discussed concerning the same experiment performed using an opening diameter of 10 μm and different mask material. An aromatic polyamide acid solution was spin-coated on the substrate and the mask layer 13 of a polyimide was formed by a heat treatment. The substrate 11 and the electrode layer 12 were the same as those in the first embodiment.

The opening 14 was formed in the following manner. Photoresist (product name: AZ1500 produced by Hoechst) was coated on the mask 13 by photolithography, and the resist was exposed and developed to form an opening therein. Thus, an etching mask was formed. The mask layer 13 at the opening in the photoresist was etched and removed by reactive ion etching using oxygen to expose the electrode layer 12. The opening 14 was thus formed. The photoresist was thereafter removed.

Openings were arranged at intervals of 200 μm in a 500×500 matrix pattern. The electrode layer 12 was used as the cathode, and a Watts bath containing nickel (II) sulfate, nickel (II) chloride, boric acid and brightener was used. The Ni electroplating was thus performed at the bath temperature of 50° C. and the cathode current density of 5 A/dm². Here, the bath (electroplating liquid) was not stirred. The Ni plated layer was initially deposited in the opening 14 and grew therein. The plated layer 15 expanded onto the mask layer 13, and the semispherical plated layer 15 was thus formed as illustrated in FIG. 8D. The plated layer was deposited until the bottom diameter of the plated layer reached 50 μm.

Ten plated layers 15 were freely selected from the above structure of the microlens mold, and the radii R of curvature and the virtual radii r of curvature were measured. R and r were found incident with each other. Accordingly, a microlens mold with the semispherical plated layer having a radius of curvature of 50 μm can be provided in this case.

The electroplating experiment was then performed under a constant current using an opening diameter of 5 μm. The substrate 11 and the electrode layer 12 were the same as above. That is, the substrate 11 was a silicon wafer which had layers of silicon dioxide with a thickness of 1 μm formed on opposite surfaces of the wafer, and the electrode layer 12 was formed by continuously layering Cr and Au on the substrate. The mask layer 13 was formed of a photoresist. Openings 14 were arranged at intervals of 25 μm in a 700×700 matrix pattern.

This wafer was used as a base, the electrode layer 12 was used as the cathode, and the Watts bath containing nickel (II) sulfate, nickel (II) chloride, boric acid and brightener was used. The Ni electroplating was thus performed at the bath temperature of 60° C. and two kinds of currents of 10 mA and 100 mA. Here, the bath was not stirred. The Ni plated layer was initially deposited in the opening 14 and grew therein. The plated layer 15 expanded onto the mask layer 13, and the semispherical plated layer 15 was thus formed as illustrated in FIG. 8D.

At each of those currents, the following substrates were formed. The plated layers 15 formed on the respective substrates had bottom diameters from 10 μm to 35 μm at intervals of 5 μm. In each microlens mold, ten plated layers 15 were freely selected from the 700×700 plated layers, and the radius of curvature R and the virtual radius r of curvature were measured for each selected plated layer. R and r were found incident with each other. A microlens mold with the semispherical plated layer having a minute radius of curvature can thus be provided by electroplating under a constant current, similar to that under a constant voltage.

From the above results, it was found that there is no difference between the radius of the side of the plated layer 15 and the radius of curvature near the optical axis. Therefore, the side surface of a microlens fabricated by the above mold can be used and a lens with a large NA can be provided where the condition of the convex plated layer 15 without the flat portion is met, when the bottom diameter $\Psi$ of the plated layer 15 coincides with the opening diameter $\phi$ and no plated layer is grown on the mask layer 13. Herein, the opening diameter meets the relation (3).

Also in the second embodiment, the same technical advantages as those of the first embodiment can be obtained. Further, a preferable microlens can be fabricated using the above mold.

The following is an example in which a microlens mold is fabricated based on the principle of the second embodiment using the Cr electroplating bath. A fused quartz glass of six square inches is used as the substrate 11. To form the electrode layer 12, Cr and Au are continuously layered at thicknesses of 10 nm and 200 nm on the above substrate, respectively, using the electron beam vacuum-evaporation method which is one of the thin-film forming methods.

Coating, exposure and development of a photoresist are performed using photolithography to form the opening 14 in the resist. The photoresist is used as the mask layer 13.

Herein, the opening 14 has a circular shape. and the diameter $\phi$ and pitch of the opening 14 are respectively 5 µm and 35 µm. Each block has the above arrangement of the openings 14 in a 100×100 matrix pattern. 8×8 blocks are arranged at inter-block intervals of 20 mm on the substrate 11.

The Cr electroplating is performed using the electrode layer 12 as the cathode and using the Cr electroplating bath containing chromic acid and sulfuric acid. The Cr plated layer is initially deposited on the electrode layer 12 in the opening 14, and the plated layer 15 has a convex profile when the plated layer is formed in the opening 14. After that, the plated layer 15 expands onto the mask layer 13 as the electroplating further continues. The plated layer 15 having a semispherical profile is thus formed. The electroplating is continued until the radius of the semispherical profile reaches 70 µm, and the continuous plated layer 15 is formed.

A microlens array is formed using the above mold with the semispherical Cr plated layer 15. As illustrated in FIG. 13A, the ultraviolet-ray curing resin 59 is dropped on the mold 51-55. The glass substrate 57 is then placed on the resin 59, and the resin 59 exposed to ultraviolet radiation through the glass 57 to cure the resin 59. After that, the glass 57 and the resin 59 are separated from the mold. Thus, the concave microlens array 59 is obtained. The concave microlens has an inverted profile of the mold on the glass 57 as illustrated in FIG. 13B.

An ultraviolet-ray curing resin 58 is coated on the concave microlens. The resin 58 has a larger refractive index than that of the resin 59. A glass substrate is put on the resin 58 to flatten the surface of the resin 58. The resin 58 is exposed to ultraviolet rays to be hardened. The glass substrate is separated from the hardened ultraviolet-ray curing resin 58. A complete microlens array can be thus produced as illustrated in FIG. 13C.

Using the same microlens mold, a thousand pieces of the above microlens arrays were repeatedly produced by the same method. After that, the surface of the microlens mold of the second embodiment was observed. No corrosion, scratches and the like could be seen.

In a third embodiment, Pt is used as an electrode layer 32. The third embodiment will be described with reference to FIGS. 11A-11E. A substrate of this embodiment is produced similarly to the first embodiment.

A silicon wafer with a diameter of six inches is thermally oxidized using an oxidizing gas, and layers of silicon dioxide with a thickness of 1 µm are formed on opposite surfaces of the wafer. This wafer is used as a substrate 31 illustrated in FIGS. 11A-11E. Ti and Pt are sequentially deposited with thicknesses of 10 nm and 200 nm on the above wafer, respectively, using a vacuum sputtering method which is one of thin-film forming methods. The electrode layer 32 is thus form Aromatic polyamideacid solution is then spin-coated, and this coating is thermally treated to form a mask layer 33 of polyimide.

Further, coating, exposure and development of the photoresist are preformed using conventional photolithography to form an opening layer 33 at the resist opening is etched by the reactive ion etching using oxygen. Thus, the electrode layer 32 is exposed and the opening 34 is formed. The photoresist is removed thereafter.

Herein, the opening 34 has a circular shape with a diameter of 10 µm. Openings 34 are arranged at intervals of 200 µm in a 500×500 matrix pattern. The electrode layer 32 is used as a cathode, and a Ni electroplating bath containing nickel (II) sulfate, nickel (II) chloride, boric acid and brightener is use Ni electroplating is thus performed at the bath temperature of 50° C. and the cathode current density of 5 A/dm². A Ni plated layer 35 is initially deposit in the opening 34 and grows therein. The plated layer expands onto the mask layer 33, and the semispherical plated layer 35 is thus formed as illustrated in FIG. The plated layer 35 is deposited until its radius reaches 50 µm. This can be confirmed by using a microscope, for example.

PSG (phospho-silicate glass) with a thickness of 1 µm is then deposited at 350° C. by a atmospheric-pressure CVD (chemical vapor deposition) method to form a sacrificial layer 37 as illustrated in FIG. 11A. Ti and Au are continuously layered with thicknesses of 10 nm and 200 nm on the above wafer, respectively, using an electron-beam evaporation method. An electrode layer 38 for a mold is thus formed as illustrated in FIG. 11B.

The electrode layer 38 is then used as a cathode, and the above Ni electroplating bath is used. Ni electroplating is thus performed at the bath temperature of 50° C. and the cathode current density of 5 A/dm². A mold 39 is thus formed as illustrated in FIG. 11C.

The wafer of FIG. 11C is then immersed in a mixture solution of hydrofluoric acid and ammonium fluoride to etch and remove the sacrificial layer 37 of PSG. The substrate 31 and the mold 39 can be separated as illustrated in FIG. 11D. The Ti of the electrode layer 38 can be removed simultaneously. After that, the electrode layer 38 is etched by a mixture solution of iodine and potassium iodide. The mold 39 for a microlens can be thus produced as illustrated in FIG. 11E.

The separated substrate has a semispherical structure as illustrated in FIG. 11A, except for the sacrificial layer 37. Therefore, a mold for a microlens can be repeatedly produced by performing the steps of FIGS. 11A-11E using this separated substrate.

In a fabrication method of a microlens mold according to this embodiment, the mold can be fabricated by electroplating. Accordingly, a plurality of molds with the same profile can be produced. Thus, plural molds can be fabricated in this embodiment by using the mold master and the sacrificial-layer forming process, in contrast with the prior art mold forming method in which a single original mold is used. Hence, fabrication costs can be further reduced in this embodiment.

A fabrication process of a microlens using this concave mold will be described with reference to FIGS. 12A-12C. A resin 40 of ultraviolet-ray curing photopolymer is deposited on the concave mold 39, and after a support substrate 41 of glass is put on the resin 40, the resin 40 is hardened by exposing the resin 40 to ultraviolet rays. The resin 40 can be separated from the microlens mold 39 by lifting the glass substrate 41. Thus, a microlens array can be formed. Here, a thousand photopolymer microlenses could be formed by the same microlens mold, using the same method.

In a fourth embodiment, an electrode layer 32 is formed of the same material as that of a plated layer 35. The fourth embodiment will also be described with reference to FIGS. 11A-11E.

A substrate of this embodiment is also produced similarly to the first embodiment. A silicon wafer with a diameter of six inches is thermally oxidized using an oxidizing gas, and layers of silicon dioxide with a thickness of 1 μm are formed on opposite surfaces of the wafer. This wafer is used as a substrate 31 illustrated in FIGS. 11A-11E. Ti and Ni are continuously layered with thicknesses of 10 nm and 200 nm on the above wafer, respectively, using the vacuum sputtering method which is one of thin-film forming methods. The electrode layer 32 is thus formed. Aromatic polyamide acid solution is then spin-coated and this coating is thermally treated to form a mask layer 33 of polyimide.

Further, coating, exposure and development of the photoresist are performed using photolithography to form an opening in the resist. The mask layer 33 at the resist opening is etched by the reactive ion etching using oxygen. Thus, the electrode layer 32 is exposed, and the opening 34 is formed. The photoresist is removed thereafter.

Herein, the opening 34 also has a circular shape with a diameter of 10 μm. Openings 34 are arranged at intervals of 200 μm in a 500×500 matrix pattern. The electrode layer 32 is used as a cathode, and a Ni electroplating bath containing nickel (II) sulfate, nickel (II) chloride, boric acid and brightener is used. Ni electroplating is thus performed at the bath temperature of 50° C. and the cathode current density of 5 A/dm$^2$. The Ni plated layer 35 is initially deposited in the opening 34 and grows therein. The plated layer 35 expands onto the mask layer 33, and the semispherical plated layer 35 is thus formed as illustrated in FIG. 11A. The plated layer 35 is deposited until its radius reaches 50 μm. This can be confirmed by using a microscope.

Since the material of the electrode layer 32 is the same as that of the plated layer 35, there is no mismatch of crystalline lattices between those layers 32 and 35 which is likely to occur between different materials. Therefore, the plated layer 35 can be smoothly formed on the electrode layer 32, and the semispherical structure can be firmly connected to the electrode layer 32. Thus, the semispherical structure would not separate during the cleansing process and the like, so the wafer can be readily handled.

PSG with a thickness of 1 μm is then deposited at 350° C. by the atmospheric-pressure CVD method to form a sacrificial layer 37 as illustrated in FIG. 11A. Ti and Au are continuously layered with thicknesses of 10 nm and 200 nm on the above wafer, respectively, using the electron-beam evaporation method. An electrode layer 38 for a mold is thus formed as illustrated in FIG. 11B.

The electrode layer 38 is then used as a cathode, and the above Ni electroplating bath is used. Ni electroplating is thus performed at the bath temperature of 50° C. and the cathode current density of 5 A/dm$^2$. A mold 39 is thus formed as illustrated in FIG. 11C.

The wafer of FIG. 11C is then immersed in a mixture solution of hydrofluoric acid and ammonium fluoride to etch and remove the sacrificial layer 37 of PSG. The substrate 31 and the mold 39 can be separated as illustrated in FIG. 11D. The Ti of the electrode layer 38 can be removed simultaneously. After that, the electrode layer 38 is etched by a mixture solution of iodine and potassium iodide. The mold 39 for a microlens can be thus produced as illustrated in FIG. 11E.

The separated substrate has a semispherical structure as illustrated in FIG. 11A, except for the sacrificial layer 37. Therefore, a mold for a microlens can be repeatedly produced by performing the steps of FIGS. 11A-11E using this separated substrate.

Regarding other points, the fourth embodiment is substantially the same as the third embodiment.

In a fifth embodiment, an electrode layer 32 is formed of material which can be easily diffused into a plated layer 35. The fifth embodiment will also be described with reference to FIGS. 11A-11E.

A substrate of this embodiment is also produced similarly to the first embodiment. A silicon wafer with a diameter of six inches is thermally oxidized using an oxidizing gas, and layers of silicon dioxide with a thickness of 1 μm are formed on opposite surfaces of the wafer. This wafer is used as a substrate 31 illustrated in FIGS. 11A-11E. Ti and Au are continuously layered with thicknesses of 10 nm and 200 nm on the above wafer, respectively, using the vacuum sputtering method. The electrode layer 32 is thus formed. Aromatic polyamide acid solution is then spin-coated and this coating is thermally treated to form a mask layer 33 of polyimide.

Further, coating, exposure and development of photoresist are performed using the photolithography to form an opening in the resist. The mask layer 33 at the resist opening is etched by reactive ion etching using oxygen. Thus, the electrode layer 32 is exposed and the opening 34 is formed. The photoresist is removed thereafter.

Herein, the opening 34 also has a circular shape with a diameter of 10 μm. Openings 34 are arranged at intervals of 200 μm in a 500×500 matrix pattern. The electrode layer 32 is used as a cathode, and a Ni electroplating bath containing nickel (II) sulfate, nickel (II) chloride, boric acid and brightener is used. Ni electroplating is thus performed at the bath temperature of 50° C. and the cathode current density of 5 A/dm$^2$. The Ni plated layer 35 is initially deposited in the opening 34 and grows therein. The plated layer 35 expands onto the mask layer 33, and the semispherical plated layer 35 is thus formed as illustrated in FIG. 11A. The plated layer 35 is deposited until its radius reaches 50 μm. This can be confirmed by using a microscope.

Herein, the electrode layer 32 is diffused into the plated layer 35. This was verified by the fact that a diffusion layer of an alloy of nickel and gold could be found around the electrode layer 32 at the opening 34 when the thus-formed semispherical structure was dissolved in sulfuric acid solution. Thus, Au of the electrode layer 32 is diffused into the plated layer 35 of nickel, and the semispherical structure can be firmly connected to the electrode layer 32. Hence, the semispherical structure would not separate during the cleansing process and the like, so the wafer can be readily handled.

PSG with a thickness of 1 μm is then deposited at 350° C. by the atmospheric-pressure CVD method to form a sacrificial layer 37 as illustrated in FIG. 11A. Ti and Au are continuously layered with thicknesses of 10 nm and 200 nm on the above wafer, respectively, using the electron-beam evaporation method. An electrode layer 38 for a mold is thus formed as illustrated in FIG. 11B.

The electrode layer 38 is then used as a cathode, and the above Ni electroplating bath is used. Ni electroplating is thus performed at the bath temperature of 50° C. and the cathode current density of 5 A/dm². A mold 39 is thus formed as illustrated in FIG. 11C.

The wafer of FIG. 11C is then immersed in a mixture solution of hydrofluoric acid and ammonium fluoride to etch and remove the sacrificial layer 37 of PSG. The substrate 31 and the mold 39 can be separated as illustrated in FIG. 11D. The Ti of the electrode layer 38 can be removed simultaneously. After that, the electrode layer 38 is etched by a mixture solution of iodine and potassium iodide. The mold 39 for a microlens can be thus produced as illustrated in FIG. 11E.

The separated substrate has a semispherical structure as illustrated in FIG. 11A, except for the sacrificial layer 37. Therefore, a mold for a microlens can be repeatedly produced by performing the steps of FIGS. 11A-11E using this separated substrate.

Regarding other points, the fifth embodiment is substantially the same as the third embodiment.

In a sixth embodiment, a mold is fabricated using another method. The sixth embodiment will also be described with reference to FIGS. 11A-11E.

A semispherical structure of a plated layer 35 is formed on a substrate 31 with an electrode layer 32, a mask layer 33 and an opening 34 by the same method as that of the third embodiment. PSG with a thickness of 1 μm is then deposited at 350° C. by the atmospheric-pressure CVD method to form a sacrificial layer 37 as illustrated in FIG. 11A. Ti and Au are continuously layered with thicknesses of 10 nm and 200 nm on the above wafer, respectively, using the electron-beam evaporation method. An electrode layer 38 for a mold is thus formed as illustrated in FIG. 11B to fabricate a mold master.

The electrode layer 38 is then used as a cathode, and a Ni electroplating bath containing nickel (II) sulfamate, nickel bromide, boric acid and brightener is used. Ni electroplating is thus performed at the bath temperature of 50° C. and the cathode current density of 5 A/dm². A mold 39 is thus formed as illustrated in FIG. 11C.

The wafer of FIG. 11C is then immersed in a mixture solution of hydrofluoric acid and ammonium fluoride to etch and remove the sacrificial layer 37 of PSG. The substrate 31 and the mold 39 can be separated as illustrated in FIG. 11D. The Ti of the electrode layer 38 can be removed simultaneously. After that, the electrode layer 38 is etched by a mixture solution of iodine and potassium iodide. The mold 39 for a microlens can be thus produced as illustrated in FIG. 11E.

Since the nickel (II) sulfamate bath is used as the electroplating bath, warping of the mold due to electroplating stress can be reduced or eliminated.

Regarding other points, the sixth embodiment is substantially the same as the third embodiment.

In the foregoing this invention is described using a microlens mold or a microlens array mold. The principle of this invention, however, can be more broadly applied to a microstructure having the above-discussed structural features and a mold for a microstructure.

Figure 14:
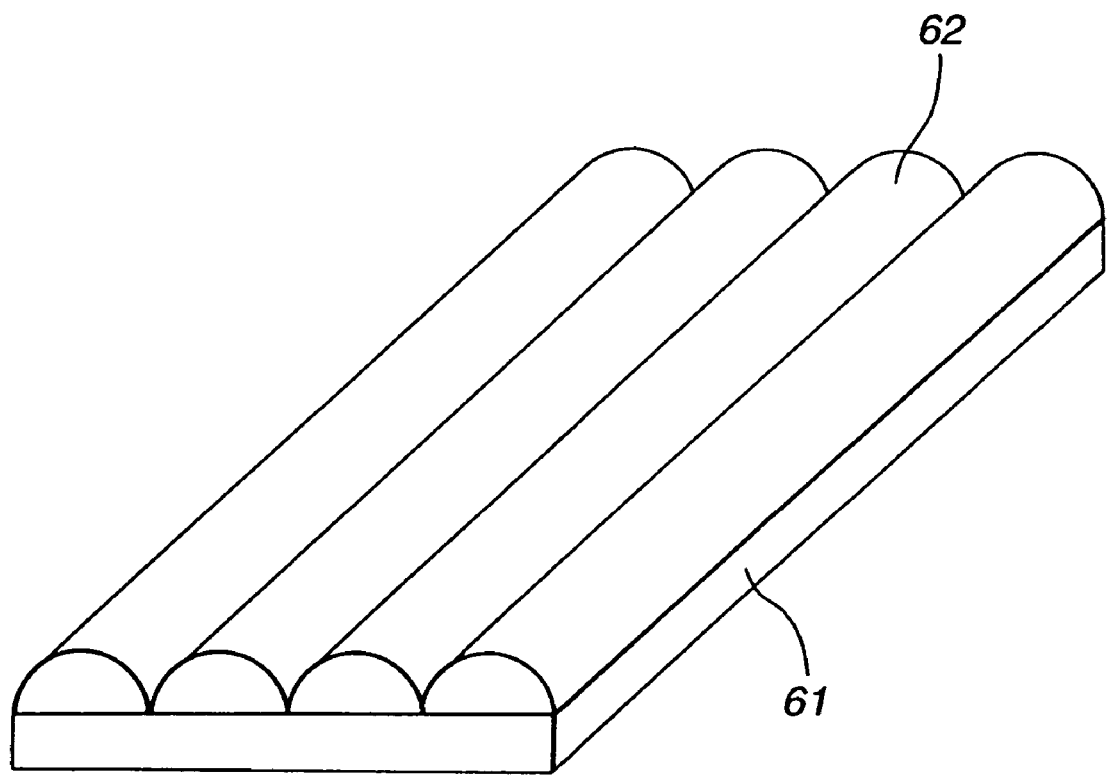
FIG. 14 is a perspective view illustrating a mold for a lenticular lens array according to the present invention.

Further, the opening has a circular shape in the above embodiments, but the opening can have other shapes, such as a slit-like shape or an elongated rectangular shape. When the opening has the slit-like shape, a semicylindrical plated layer can be formed and a mold for a lenticular lens or a lenticular lens array can be fabricated, for example. FIG. 14 illustrates a lenticular lens mold 62 fabricated on a substrate 61 according to the above method.

As described in the foregoing, when the microlens mold of this invention meets the relation (1) regarding the opening diameter φ, the mold can have a desired radius of curvature on the optical axis.

Further, when the microlens mold of this invention meets the condition that the opening diameter is below 10 μm, the mold can have a desired structure in which the radius of curvature of the side of the plated layer is about equal to the radius of curvature near the optical axis. The microlens fabricated using this mold can be a lens with a large NA.

Further, in the fabrication method of the microlens mold of this invention, where the plated layer formed in the opening at the beginning of the electroplating growth has the flat portion, the mold having the plated layer with a desired radius of curvature on the optical axis can be fabricated when the relation (1) is met.

Furthermore, in the fabrication method of the microlens mold of this invention, where the plated layer formed in the opening at the beginning of the electroplating growth is the convex layer without the flat portion, the radius of curvature of the side of the plated layer is about equal to the radius of curvature near the optical axis and the microlens fabricated using this mold can have a usable side. Thus, the lens with a large NA can be provided.

Meanwhile, conditions for forming the above plated layer are independent of the kind of the electroplating bath used.

Thus, according to the present invention, a minute microlens with a radius of curvature below several hundreds of microns (especially, below about 300 μm), or with a top portion's radius of curvature below 200 μm, can be fabricated with good, precise profile.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A fabrication method of a mold for a microlens having a desired radius (R) of curvature, the method comprising the steps of:
   (a) preparing a substrate at least a portion of which is electrically conductive;
   (b) forming an insulating mask layer on the substrate such that the insulating mask layer has an opening to expose the conductive portion of the substrate, a diameter or width (φ) of the opening being 10 μm≦φ≦0.35 R and R≦200 μm;
   (c) performing electroplating using the conductive portion of the substrate as a cathode to deposit a first electroplated portion in the opening and on the mask layer;
   (d) terminating electroplating when the first electroplated portion reaches the desired radius (R) of the curvature after forming a minimum radius ($R_{min}$) of curvature;
   (e) forming a sacrificial layer on the first electroplated portion;
   (f) forming an electrode layer on the sacrificial layer; and
   (g) forming a plated portion used as the mold on the electrode layer by electroplating by using the electrode layer as a cathode,
   wherein the desired radius (R) of curvature and the minimum radius ($R_{min}$) are radii at an optical axis of the first electroplated portion.

2. The method according to claim 1, wherein the step (c) comprises causing a current to flow between the cathode and an anode plate in an electroplating bath and the step (d) comprises ending the current flow.

3. A fabrication method of a microlens having a desired radius (R) of curvature, the method comprising the steps of:
  (a) preparing a substrate at least a portion of which is electrically conductive;
  (b) forming an insulating mask layer on the substrate such that the insulating mask layer has an opening to expose the conductive portion of the substrate, a diameter or width ($\phi$) of the opening being 10 $\mu m \leq \phi \leq 0.35$ R and R$\leq$200 $\mu$m;
  (c) performing electroplating using the conductive portion of the substrate as a cathode to deposit a first electroplated portion in the opening and on the mask layer;
  (d) terminating electroplating when the first electroplated portion reaches the desired radius (R) of curvature after forming a minimum radius ($R_{min}$) of curvature;
  (e) forming a sacrificial layer on the first electroplated portion;
  (f) forming an electrode layer on the sacrificial layer;
  (g) forming a plated portion used as the mold on the electrode layer by electroplating by using the electrode layer as a cathode
  (h) separating the mold from the substrate by etching the sacrificial layer;
  (i) forming a lens material on the mold; and
  (j) separating the lens material from the mold,
  wherein the desired radius (R) of curvature and the minimum radius ($R_{min}$) are radii at an optical axis of the first electroplated portion.

* * * * *